(12) United States Patent
Dye

(10) Patent No.: US 6,173,381 B1
(45) Date of Patent: *Jan. 9, 2001

(54) MEMORY CONTROLLER INCLUDING EMBEDDED DATA COMPRESSION AND DECOMPRESSION ENGINES

(75) Inventor: Thomas A. Dye, Austin, TX (US)

(73) Assignee: Interactive Silicon, Inc., Austin, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/916,464

(22) Filed: Aug. 8, 1997

Related U.S. Application Data

(60) Continuation of application No. 08/463,106, filed on Jun. 5, 1995, now abandoned, which is a division of application No. 08/340,667, filed on Nov. 16, 1994, now Pat. No. 6,002,411.

(51) Int. Cl.[7] .................................................. G06F 13/00
(52) U.S. Cl. ..................... 711/170; 711/159; 711/160; 711/165; 711/155; 710/68; 709/247; 345/202; 345/521; 382/232
(58) Field of Search .................................... 395/341, 888, 395/133, 159; 711/203, 170, 160, 133, 134, 136, 155, 159, 165; 709/247; 345/521, 202, 509; 710/68; 714/763, 764; 382/232

(56) References Cited

U.S. PATENT DOCUMENTS

| | | | |
|---|---|---|---|
| 4,008,460 | * | 2/1977 | Bryant et al. .......................... 395/463 |
| 4,688,108 | * | 8/1987 | Cotton et al. ....................... 358/261.1 |
| 4,881,075 | * | 11/1989 | Weng ...................................... 341/87 |
| 4,929,946 | * | 5/1990 | O'Brien et al. ........................ 341/87 |

(List continued on next page.)

\* cited by examiner

Primary Examiner—Eddie P. Chan
Assistant Examiner—Hong Kim
(74) Attorney, Agent, or Firm—Conley, Rose & Tayon, PC; Jeffrey C. Hood

(57) ABSTRACT

An integrated memory controller (IMC) which includes data compression and decompression engines for improved performance. The memory controller (IMC) of the present invention preferably sits on the main CPU bus or a high speed system peripheral bus such as the PCI bus and couples to system memory. The IMC preferably uses a lossless data compression and decompression scheme. Data transfers to and from the integrated memory controller of the present invention can thus be in either two formats, these being compressed or normal (non-compressed). The IMC also preferably includes microcode for specific decompression of particular data formats such as digital video and digital audio. Compressed data from system I/O peripherals such as the hard drive, floppy drive, or local area network (LAN) are decompressed in the IMC and stored into system memory or saved in the system memory in compressed format. Thus, data can be saved in either a normal or compressed format, retrieved from the system memory for CPU usage in a normal or compressed format, or transmitted and stored on a medium in a normal or compressed format. Internal memory mapping allows for format definition spaces which define the format of the data and the data type to be read or written. Software overrides may be placed in applications software in systems that desire to control data decompression at the software application level. The integrated data compression and decompression capabilities of the IMC remove system bottle-necks and increase performance. This allows lower cost systems due to smaller data storage requirements and reduced bandwidth requirements. This also increases system bandwidth and hence increases system performance. Thus the IMC of the present invention is a significant advance over the operation of current memory controllers.

97 Claims, 19 Drawing Sheets

U.S. PATENT DOCUMENTS

| | | | | |
|---|---|---|---|---|
| 5,237,460 | * | 8/1993 | Miller et al. | 395/888 |
| 5,247,638 | * | 9/1993 | O'Brien et al. | 395/888 |
| 5,247,646 | * | 9/1993 | Osterlund et al. | 395/888 |
| 5,353,425 | * | 10/1994 | Matamy et al. | 711/144 |
| 5,357,614 | * | 10/1994 | Pattisam et al. | 395/250 |
| 5,396,343 | * | 3/1995 | Hanselman | 358/426 |
| 5,420,696 | * | 5/1995 | Wegeng et al. | 358/468 |
| 5,455,577 | * | 10/1995 | Slivka et al. | 341/51 |
| 5,479,587 | * | 12/1995 | Campbell et al. | 358/1.17 |
| 5,483,622 | * | 1/1996 | Zimmerman et al. | 358/1.15 |
| 5,504,842 | * | 4/1996 | Gentile | 358/1.15 |
| 5,548,742 | * | 8/1996 | Wang et al. | 711/128 |
| 5,559,978 | * | 9/1996 | Spilo | 711/203 |
| 5,563,595 | | 10/1996 | Strohacker | 341/106 |
| 5,584,008 | * | 12/1996 | Shimada et al. | 711/114 |
| 5,602,976 | * | 2/1997 | Cooper et al. | 358/1.17 |
| 5,606,428 | * | 2/1997 | Hanselman | 358/404 |
| 5,652,878 | * | 7/1997 | Craft | 707/1 |
| 5,696,912 | * | 12/1997 | Bicevskis et al. | 395/308 |
| 5,696,926 | * | 12/1997 | Culbert et al. | 711/203 |
| 5,699,539 | * | 12/1997 | Garber et al. | 711/2 |
| 5,708,763 | * | 1/1998 | Peltzer | 395/115 |
| 5,812,817 | * | 9/1998 | Hovis et al. | 711/173 |
| 5,828,877 | | 10/1998 | Pearce et al. | 395/670 |

Normal or compressed data transfer, No modification by IMC

Memory to memory decompression

Memory decompression to CPU or Disk

Decompression from Disk or CPU to memory

Decompression of disk to CPU

Memory to memory Compression

Compression from memory to CPU or Disk

Compression from CPU or disk to memory

FIG. 15 Compression of CPU data to Disk or I/O subsystem

MEMORY CONTROLLER INCLUDING EMBEDDED DATA COMPRESSION AND DECOMPRESSION ENGINES This is a continuation of application Ser. No. 08/463,106, now abandoned titled "Memory Controller Including Embedded Data Compression and Decompression Engines" filed Jun. 5, 1995, whose inventor is Thomas A. Dye, which is a divisional of application Ser. No. 08/340,667, now U.S. Pat. No. 6,002,411 titled "Integrated Video and Memory Controller with Data Processing and Graphical Processing Capabilities" and filed Nov. 16, 1994, whose inventor is Thomas A. Dye.

FIELD OF THE INVENTION

The present invention relates to computer system architectures, and more particularly to an integrated memory and graphics controller which includes an embedded data compression and decompression engine for increased system bandwidth and efficiency.

DESCRIPTION OF THE RELATED ART

Since their introduction in 1981, the architecture of personal computer systems has remained substantially unchanged. The current state of the art in computer system architectures includes a central processing unit (CPU) which couples to a memory controller interface that in turn couples to system memory. The computer system also includes a separate graphical interface for coupling to the video display. In addition, the computer system includes input/output (I/O) control logic for various I/O devices, including a keyboard, mouse, floppy drive, hard drive, etc.

In general, the operation of a modern computer architecture is as follows. Programs and data are read from a respective I/O device such as a floppy disk or hard drive by the operating system, and the programs and data are temporarily stored in system memory. Once a user program has been transferred into the system memory, the CPU begins execution of the program by reading code and data from the system memory through the memory controller. The application code and data are presumed to produce a specified result when manipulated by the system CPU. The code and data are processed by the CPU and data is provided to one or more of the various output devices. The computer system may include several output devices, including a video display, audio (speakers), printer, etc. In most systems, the video display is the primary output device.

Graphical output data generated by the CPU is written to a graphical interface device for presentation on the display monitor. The graphical interface device may simply be a video graphics array (VGA) card, or the system may include a dedicated video processor or video acceleration card including separate video RAM (VRAM). In a computer system including a separate, dedicated video processor, the video processor includes graphics capabilities to reduce the workload of the main CPU. Modern prior art personal computer systems typically include a local bus video system based on either the peripheral component interconnect (PCI) bus or the VESA (Video Electronics Standards Association) VL bus, or perhaps a proprietary local bus standard. The video subsystem is generally positioned on a local bus near the CPU to provide increased performance.

Therefore, in summary, program code and data are first read from the hard disk to the system memory. The program code and data are then read by the CPU from system memory, the data is processed by the CPU, and graphical data is written to the video RAM in the graphical interface device for presentation on the display monitor. The CPU typically reads data from system memory across the system bus and then writes the processed data or graphical data back to the I/O bus or local bus where the graphical interface device is situated. The graphical interface device in turn generates the appropriate video signals to drive the display monitor. It is noted that this operation requires the data to make two passes across the system bus and/or the I/O subsystem bus. In addition, the program which manipulates the data must also be transferred across the system bus from the main memory. Further, two separate memory subsystems are required, the system memory and the dedicated video memory, and video data is constantly being transferred from the system memory to the video memory frame buffer. FIG. 1 illustrates the data transfer paths in a typical computer system using prior art technology.

Computer systems are being called upon to perform larger and more complex tasks that require increased computing power. In addition, modem software applications require computer systems with increased graphics capabilities. Modem software applications typically include graphical user interfaces (GUIs) which place increased burdens on the graphics capabilities of the computer system. Further, the increased prevalence of multimedia applications also demands computer systems with more powerful graphics capabilities. Therefore, a new computer system and method is desired which provides increased system performance and in particular, increased video and/or graphics performance, than that possible using prior art computer system architectures.

SUMMARY OF THE INVENTION

The present invention comprises an integrated memory controller (IMC) which includes data compression/decompression engines for improved performance. The memory controller (IMC) of the present invention preferably sits on the main CPU bus or a high speed system peripheral bus such as the PCI bus. The IMC includes one or more symmetric memory ports for connecting to system memory. The IMC also includes video outputs to directly drive the video display monitor as well as an audio interface for digital audio delivery to an external stereo digital-to-analog converter (DAC).

The IMC transfers data between the system bus and system memory and also transfers data between the system memory and the video display output. Therefore, the IMC architecture of the present invention eliminates the need for a separate graphics subsystem. The IMC also improves overall system performance and response using main system memory for graphical information and storage. The IMC system level architecture reduces data bandwidth requirements for graphical display since the host CPU is not required to move data between main memory and the graphics subsystem as in conventional computers, but rather the graphical data resides in the same subsystem as the main memory. Therefore, for graphical output, the host CPU or DMA master is not limited by the available bus bandwidth, thus improving overall system throughput.

The integrated memory controller of the preferred embodiment includes a bus interface unit which couples through FIFO buffers to an execution engine. The execution engine includes a compression/decompression engine according to the present invention as well as a texture mapping engine according to the present invention. In the preferred embodiment the compression/decompression engine comprises a single engine which performs both compression and decompression. In an alternate embodiment, the execution engine includes separate compression and decompression engines.

The execution engine in turn couples to a graphics engine which couples through FIFO buffers to one or more symmetrical memory control units. The graphics engine is similar in function to graphics processors in conventional computer systems and includes line and triangle rendering operations as well as span line interpolators. An instruction storage/decode block is coupled to the bus interface logic which stores instructions for the graphics engine and memory compression/decompression engines. A Window Assembler is coupled to the one or more memory control units. The Window Assembler in turn couples to a display storage buffer and then to a display memory shifter. The display memory shifter couples to separate digital to analog converters (DACs) which provide the RGB signals and the synchronization signal outputs to the display monitor. The window assembler includes a novel display list-based method of assembling pixel data on the screen during screen refresh, thereby improving system performance. In addition, a novel antialiasing method is applied to the video data as the data is transferred from system memory to the display screen. The internal graphics pipeline of the IMC is optimized for high end 2D and 3D graphical display operations, as well as audio operations, and all data is subject to operation within the execution engine and/or the graphics engine as it travels through the data path of the IMC.

As mentioned above, according to the present invention the execution engine of the IMC includes a compression/decompression engine for compressing and decompressing data within the system. The IMC preferably uses a lossless data compression and decompression scheme. Data transfers to and from the integrated memory controller of the present invention can thus be in either two formats, these being compressed or normal (non-compressed). The execution engine also preferably includes microcode for specific decompression of particular data formats such as digital video and digital audio. Compressed data from system I/O peripherals such as the hard drive, floppy drive, or local area network (LAN) are decompressed in the IMC and stored into system memory or saved in the system memory in compressed format. Thus, data can be saved in either a normal or compressed format, retrieved from the system memory for CPU usage in a normal or compressed format, or transmitted and stored on a medium in a normal or compressed format. Internal memory mapping allows for format definition spaces which define the format of the data and the data type to be read or written. Graphics operations are achieved preferably by either a graphics high level drawing protocol, which can be either a compressed or normal data type, or by direct display of pixel information, also in a compressed or normal format. Software overrides may be placed in applications software in systems that desire to control data decompression at the software application level. In this manner, an additional protocol within the operating system software for data compression and decompression is not required.

The compression/decompression engine in the IMC is also preferably used to cache least recently used (LRU) data in the main memory. Thus, on CPU memory management misses which occur during translation from a virtual address to a physical address, the compression/decompression engine compresses the LRU block of system memory and stores this compressed LRU block in system memory. Thus the LRU data is effectively cached in a compressed format in the system memory. As a result of the miss, if the address points to a previously compressed block cached in the system memory, the compressed block is now decompressed and tagged as the most recently used (MRU) block. After being decompressed, this MRU block is now accessible to the CPU.

The use of the compression/decompression engine to cache LRU data in compressed format in the system memory greatly improves system performance, in many instances by as much as a factor of 10, since transfers to and from disk generally have a maximum transfer rate of 10 Mbytes/sec, whereas the decompression engine can perform at over 100 Mbytes/second.

The integrated data compression and decompression capabilities of the IMC remove system bottle-necks and increase performance. This allows lower cost systems due to smaller data storage requirements and reduced bandwidth requirements. This also increases system bandwidth and hence increases system performance. Thus the IMC of the present invention is a significant advance over the operation of current memory controllers.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

U.S. patent application Ser. No. 08/340,667 titled "Integrated Video and Memory Controller with Data Processing and Graphical Processing Capabilities" and filed Nov. 16, 1994, is hereby incorporated by reference in its entirety.

Prior Art Computer System Architecture

Figure 1:
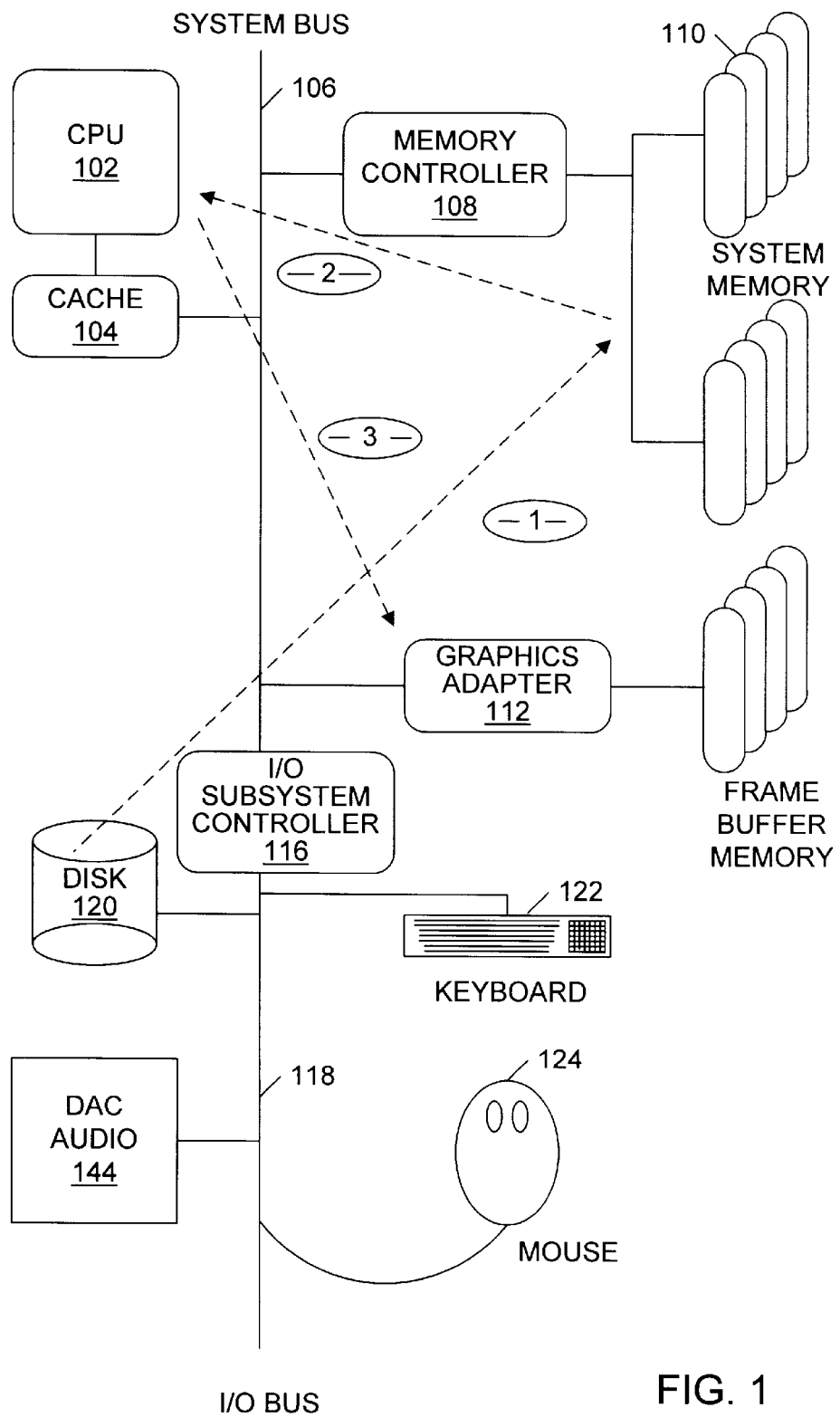
FIG. 1 is a prior art diagram illustrating data flow in a prior art computer system.

FIG. 1 illustrates a block diagram of a prior art computer system architecture. As shown, prior art computer architectures typically include a CPU 102 coupled to a cache system 104. The CPU 102 and cache system 104 are coupled to the system bus 106. A memory controller 108 is coupled to the system bus 106 and the memory controller 108 in turn couples to system memory 110. In FIG. 1, graphics adapter 112 is shown coupled to the system bus 106. However, it is noted that in modern computer systems the graphics adapter 112 is typically coupled to a separate local expansion bus such as the peripheral component interface (PCI) bus or the VESA VL bus. Prior art computer systems also typically include bridge logic coupled between the CPU 102 and the memory controller 108 wherein the bridge logic couples to the local expansion bus where the graphics adapter 112 is situated. For example, in systems which include a PCI bus, the system typically includes a host/PCI/cache bridge which integrates the cache logic 104, host interface logic, and PCI interface logic. The graphics adapter 112 couples to frame buffer memory 114 which stores the video data that is actually displayed on the display monitor. Modern prior art computer systems typically include between 1 to 4 Megabytes of video memory. An I/O subsystem controller 116 is shown coupled to the system bus 106. In computer systems which include a PCI bus, the I/O subsystem controller 116 typically is coupled to the PCI bus. The I/O subsystem controller 116 couples to an input/output (I/O) bus 118. Various peripheral I/O devices are generally coupled to the I/O bus 18, including a hard disk 120, keyboard 122, mouse 124, and audio digital-to-analog converter (DAC) 144.

Prior art computer system architectures generally operate as follows. First, programs and data are generally stored on the hard disk 120. If a software compression application is being used, data may be stored on the hard disk 120 in compressed format. At the direction of the CPU 102, the programs and data are transferred from the hard disk 120 through the I/O subsystem controller 116 to system memory 110 via the memory controller 108. If the data being read from the hard disk 120 is stored in compressed format, the data is decompressed by software executing on the CPU 102 prior to being transferred to system memory 110. Thus software compression applications require the compressed data to be transferred from the hard disk 120 to the CPU 120 prior to storage in the system memory 110.

The CPU 102 accesses programs and data stored in the system memory 110 through the memory controller 108 and the system bus 106. In processing the program code and data, the CPU 102 generates graphical data or graphical instructions that are then provided over the system bus 106 and generally the PCI bus (not shown) to the graphics adapter 112. The graphics adapter 112 receives graphical instructions or pixel data from the CPU 102 and generates pixel data that is stored in the frame buffer memory 114. The graphics adapter 112 generates the necessary video signals to drive the video display monitor (not shown) to display the pixel data that is stored in the frame buffer memory 114. When a window on the screen is updated or changed, the above process repeats whereby the CPU 102 reads data across the system bus 106 from the system memory 110 and then transfers data back across the system bus 106 and local expansion bus to the graphics adapter 112 and frame buffer memory 114.

When the computer system desires to store or cache data on the hard disk 120 in a compressed format, the data is read by the CPU 102 and compressed by the software compression application. The compressed data is then stored on the hard disk 120. If compressed data is stored in system memory 110 which must be decompressed, the CPU 102 is required to read the compressed data, decompress the data and write the decompressed data back to system memory 110.

Computer Architecture of the Present Invention

Figure 2:
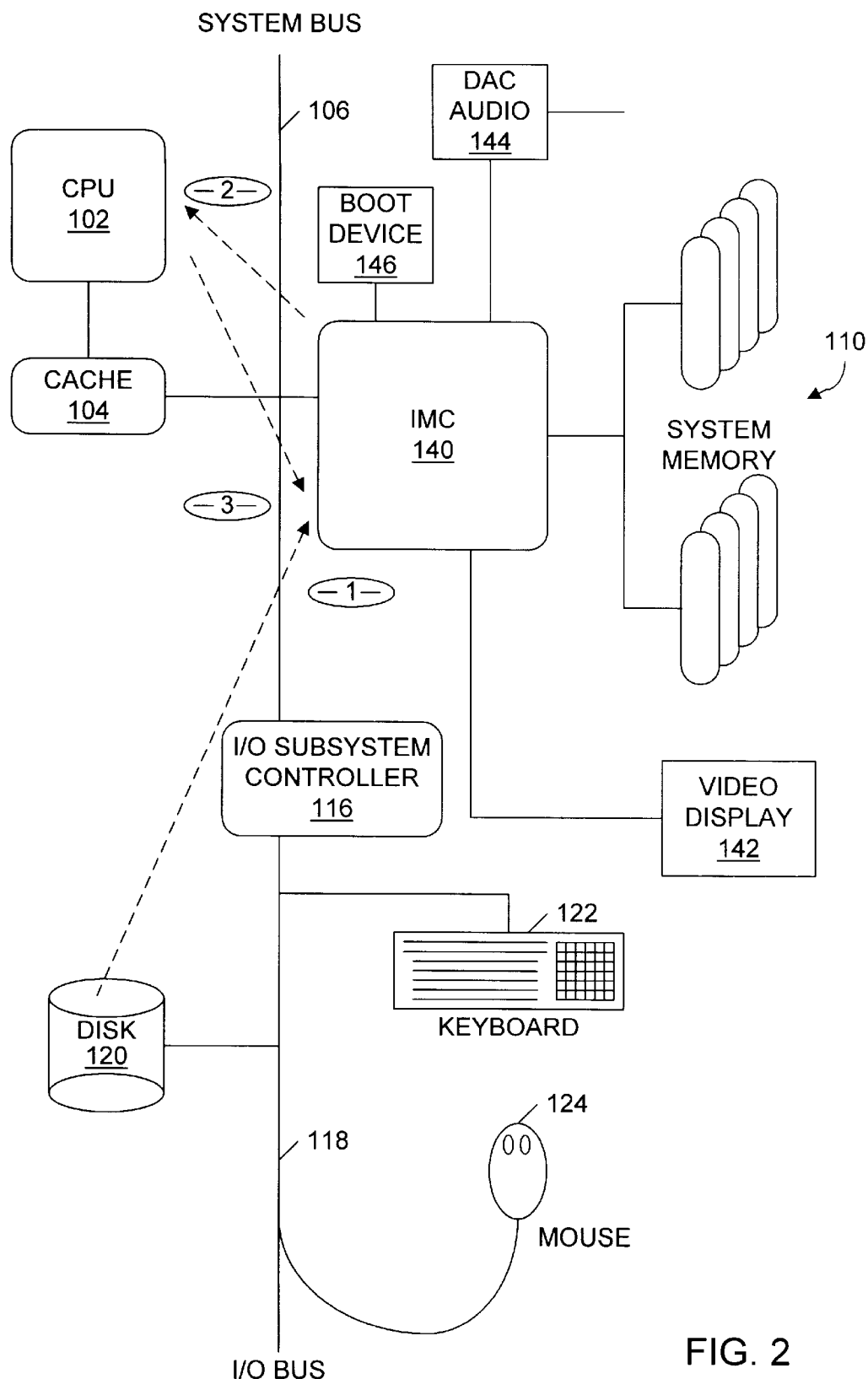
FIG. 2 is a block diagram illustrating data flow in a computer system including an integrated memory controller (IMC) according to the present invention.

Referring now to FIG. 2, a block diagram illustrating the computer architecture of a system incorporating the present invention is shown. Elements in FIG. 2 that are similar or identical to those in FIG. 1 include the same reference numerals for convenience. As shown, the computer system of the present invention includes a CPU 102 preferably coupled to a cache system 104. The CPU 102 may include a first level cache system and the cache 104 may comprise a second level cache. Alternatively, the cache system 104 may be a first level cache system or may be omitted as desired. The CPU 102 and cache system 104 are coupled to a system bus 106. The CPU 102 and cache system 104 are also directly coupled through the system bus 106 to an integrated memory controller (IMC) 140 according to the present invention. The integrated memory controller (IMC) 140 includes a compression/decompression engine for greatly increasing the performance of the computer system. It is noted that the IMC 140 can be used as the controller for main system memory 110 or can be used to control other memory subsystems as desired. The IMC 140 may also be used as the graphics controller in computer systems using prior art architectures having separate memory and video subsystems.

The IMC 140 couples to system memory 110, wherein the system memory 110 comprises one or more banks of memory. In the preferred embodiment, the system memory 110 comprises two banks of memory, and the IMC 140 preferably includes two symmetric memory ports for coupling to the two banks in system memory 110. The IMC 140 of the present invention may couple to any of various types of memory, as desired. In the preferred embodiment, the IMC 140 couples to the system memory 110 through a RAMBUS implementation. For more information on the RAMBUS memory architecture, please see "RAMBUS Architectural Overview," version 2.0, published July 1993 by RAMBUS, Inc., and "Applying RAMBUS Technology to Desktop Computer Main Memory Subsystems," version 1.0, published March 1992 by RAMBUS, Inc., which are both hereby incorporated by reference. In an alternate embodiment, the system memory 110 comprises SGRAM or single in-line memory modules (SIMMs). As noted above, the IMC 140 of the present invention may couple to any of various types of memory, as desired.

The IMC 140 also generates appropriate video signals for driving video display monitor 142. The IMC 140 preferably generates red, green, blue (RGB) signals as well as vertical and horizontal synchronization signals for generating images on the video display 142. Therefore, the integrated memory controller 140 of the present invention integrates memory controller and video and graphics controller capabilities into a single logical unit. This greatly reduces bus traffic and increases system performance. In one embodiment, the IMC 140 also generates appropriate data signals that are provided to Audio DAC 144 for audio presentation. Alternatively, the IMC 140 integrates audio processing and audio DAC capabilities and provides audio signal outputs that are provided directly to speakers. A boot device 146 is also coupled to the IMC 140 to configure or boot the IMC 140, as described further below.

Figure 3:
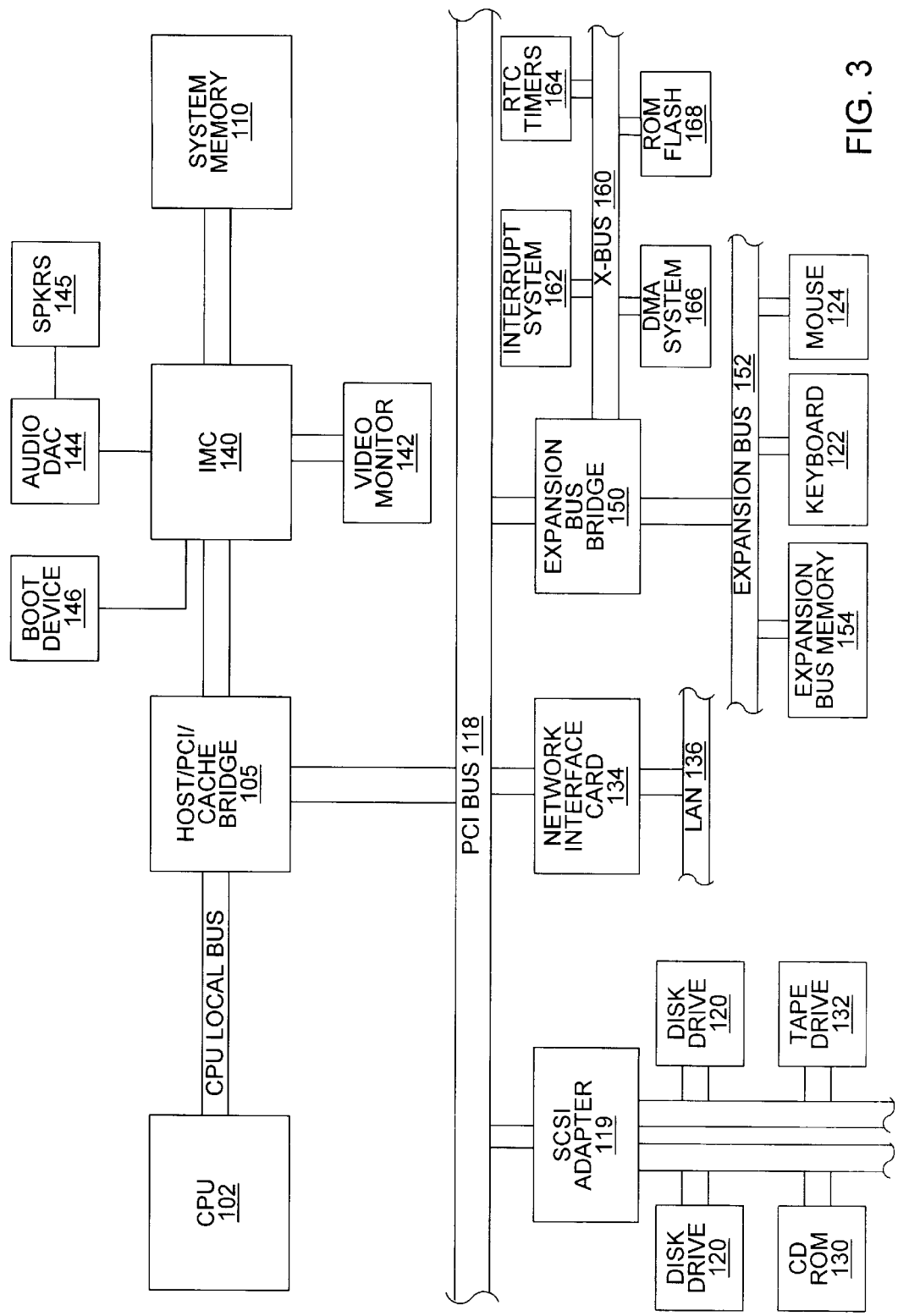
FIG. 3 illustrates a block diagram of a computer system including an IMC according to the present invention.

The IMC 140 of the present invention is preferably situated either on the main CPU bus or a high speed system peripheral bus. In the preferred embodiment, as shown in FIGS. 2 and 3, the IMC 140 is coupled directly to the system bus 106 or CPU bus, wherein the IMC 140 interfaces through a cache system 104 to the CPU 102. In an alternate embodiment, the IMC 140 is situated on the peripheral component interconnect (PCI) bus, which is a high speed peripheral local bus standard developed by Intel Corporation. For more information on the PCI bus, please see "PCI System Architecture" by Tom Shanley and Don Anderson, copyright 1993 by MindShare Inc., which is hereby incorporated by reference. Please also see PCI documentation available from Intel Corporation. In this embodiment, the cache 104 preferably comprises a PCI/cache bridge, and the system bus 106 is preferably a PCI bus. However, it is noted that the IMC 140 can sit on any various types of buses as desired.

An I/O subsystem controller 116 is coupled to the system bus 106. The I/O subsystem controller 116 in turn is coupled to an I/O bus 118. Various I/O devices are coupled to the I/O bus including a hard disk 120, keyboard 122, and mouse 124, as shown. In an embodiment including a PCI bus, the I/O subsystem Controller 116 is coupled to the PCI bus.

Typical computer programs require more system bus bandwidth for the transfer of application data than the transfer of program code executed by the CPU. Examples of application data include a bit mapped image, font tables for text output, information defined as constants, such as table or initialization information, etc. Graphical and/or video data, for example, is processed by the CPU 102 for display before the video data is written to the graphical output device. Therefore, in virtually all cases, the actual program code executed by the CPU 102 which manipulates the application data consumes considerably less system memory 110 for storage than the application data itself.

The IMC 140 includes a novel system architecture which helps to eliminate system bandwidth bottlenecks and removes extra operations required by the CPU 102 to move and manipulate application data. According to the present invention, the IMC 140 includes a data compression/decompression engine which allows application data to move about the system in a compressed format. The operation of the compression/decompression engine in the IMC 140 is discussed in greater detail below.

The IMC 140 also includes a high level protocol for the graphical manipulation of graphical data or video data which greatly reduces the amount of bus traffic required for video operations and thus greatly increases system performance. This high level protocol includes a display list based video refresh system and method whereby the movement of objects on the video display screen 142 does not require movement of pixel data in the system memory 110, but rather only requires the manipulation of display address pointers in a Display Refresh List, thus greatly increasing the performance of pixel bit block transfers, animation, and manipulation of 2D and 3D objects.

FIG. 2 illustrates the data transfer path of data within a computer system including the IMC 140 according to the present invention. As mentioned above, in typical computer systems, the program code and data is initially stored on the hard disk drive 122. First, the IMC 140 reads program code and data stored on the disk 120 using a direct memory access (DMA) and burst control methods where the IMC 140 acts as a master on the system bus 106. The program code and data are read from the disk 120 by the IMC 140 and stored in the system memory 110. In an alternative embodiment, the program code and data are transferred from the disk 120 to the IMC 140 under CPU control. The data is transferred from the hard disk 120 to the system memory 110 preferably in a compressed format, and thus the data requires less disk storage and reduced system bus bandwidth. As the data is transferred from the disk 120 to the IMC 140, the data is preferably decompressed by the decompression engine within the IMC 140 and stored in the system memory bank 110. In general, disk I/O transfer rates are sufficiently slow to allow decompression and storage of the data as the compressed data is received from the disk 120.

The CPU 102 begins program execution by reading the recently decompressed program code from the system memory 110. Portions of the program code contain information necessary to write data and/or instructions back to the IMC 140 using a special graphical protocol to direct the IMC 140 to control the display output on the video display 142. In many cases, the graphical data is not required to leave the system memory 110 and is not required to move to another location in system memory 110, but rather the display list-based operation and high level graphical protocol of the IMC 140 of the present invention enables the CPU 102 to instruct the IMC 104 how window and other graphical data is presented on the screen. This provides a tremendous improvement over prior art systems.

The IMC 140 of the present invention integrates a data compression/decompression engine into the memory controller unit. This reduces the amount of disk storage or archive storage requirements and thus reduces overall system costs. This also reduces the required amount of system memory because, when data is compressed for storage, more offscreen or non-recently-used data can be stored in system memory 110. This allows faster memory access time since less time is required to decompress the compressed data in system memory 110 than to retrieve the data from the hard disk 120. The incorporation of data compression and decompresses engines in the memory controller unit and also offloads compression tasks from the CPU 102 and avoids use of the cache system for decompression, thereby increasing system performance.

Therefore, the IMC 140 of the present invention reduces the amount of data required to be moved within the system for processing, thus reducing the overall cost while improving the performance of the computer system. According to the present invention, the CPU 102 spends much less time moving data between the various subsystems. This frees up the CPU 102 and allows the CPU 102 greater time to work on the application program rather than moving data around the system.

Computer System Block Diagram

Referring now to FIG. 3, a block diagram illustrating the preferred embodiment of a computer system incorporating the IMC 140 according to the present invention is shown. It is noted that the present invention may be incorporated into any of various types of computer systems having various system architectures. As shown, the computer system includes a central processing unit (CPU) 102 which is coupled through a CPU local bus to a host/PCI/cache bridge 105. The bridge 105 incorporates the cache 104 and I/O subsystem controller 116 of FIG. 2.

The IMC 140 of the present invention couples to the bridge 105. In the preferred embodiment, the IMC 140 comprises a single chip, as shown. However, it is noted that the IMC 140 may comprise two or more separate chips or controllers, as desired. Main memory or system memory 110 couples to the IMC 140. The IMC 140 provides video outputs to video monitor 142 and audio outputs to Audio DAC 144. Speakers 145 are connected to the Audio DAC 144. A boot device 146 is preferably coupled to the IMC 140. The host/PCI/cache bridge 105 also interfaces to a peripheral component interconnect (PCI) bus 118. In the preferred embodiment, a PCI local bus is used. However, it is noted that other local buses may be used, such as the VESA (Video Electronics Standards Association) VL bus or a proprietary bus. In an alternate embodiment, the IMC 140 is coupled directly to the PCI bus 118 as a PCI device. Alternatively, the IMC 140 is adapted to the P6.0 bus, which is a high-speed interconnect for Intel P6 processors and related devices. In one embodiment, the IMC 140 includes a pin-strappable interface which can couple either to the PCI bus or to an address/data CPU bus.

Various types of devices may be connected to the PCI bus 118. It is noted that, in prior art computer systems, a video adapter and video frame buffer would be coupled to the PCI bus 118 for controlling video functions. However, in the computer system of the present invention, video functions are performed by the IMC 140. Also, video data is stored in system memory 110, and thus a separate video frame buffer is not required.

As shown in FIG. 3, a SCSI (small computer systems interface) adapter 119 is coupled to the PCI bus 118. In the embodiment shown in FIG. 3, the SCSI adapter connects to two disk drive units 120, a CD-ROM 130, and a tape drive 132. Various other devices may be connected to the PCI bus 118, such as a network interface card 134. As shown, the network interface card 134 interfaces to a local area network (LAN) 136.

In the embodiment shown, expansion bus bridge logic 150 is coupled to the PCI bus 118. The expansion bus bridge logic 150 is coupled to the PCI bus 118. The expansions bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154, a keyboard 122 and a mouse 124. The expansion bus bridge logic 150 also couples to a peripheral expansion bus referred to as the X-bus 160. The X-bus 160 is used for connecting various peripherals to the computer system, such as an interrupt system 162, a real time clock (RTC) and timers 164, a direct memory access (DMA) system 166, and ROM/Flash memory 168, among others.

Alternate Computer System Embodiments

Figure 3A:
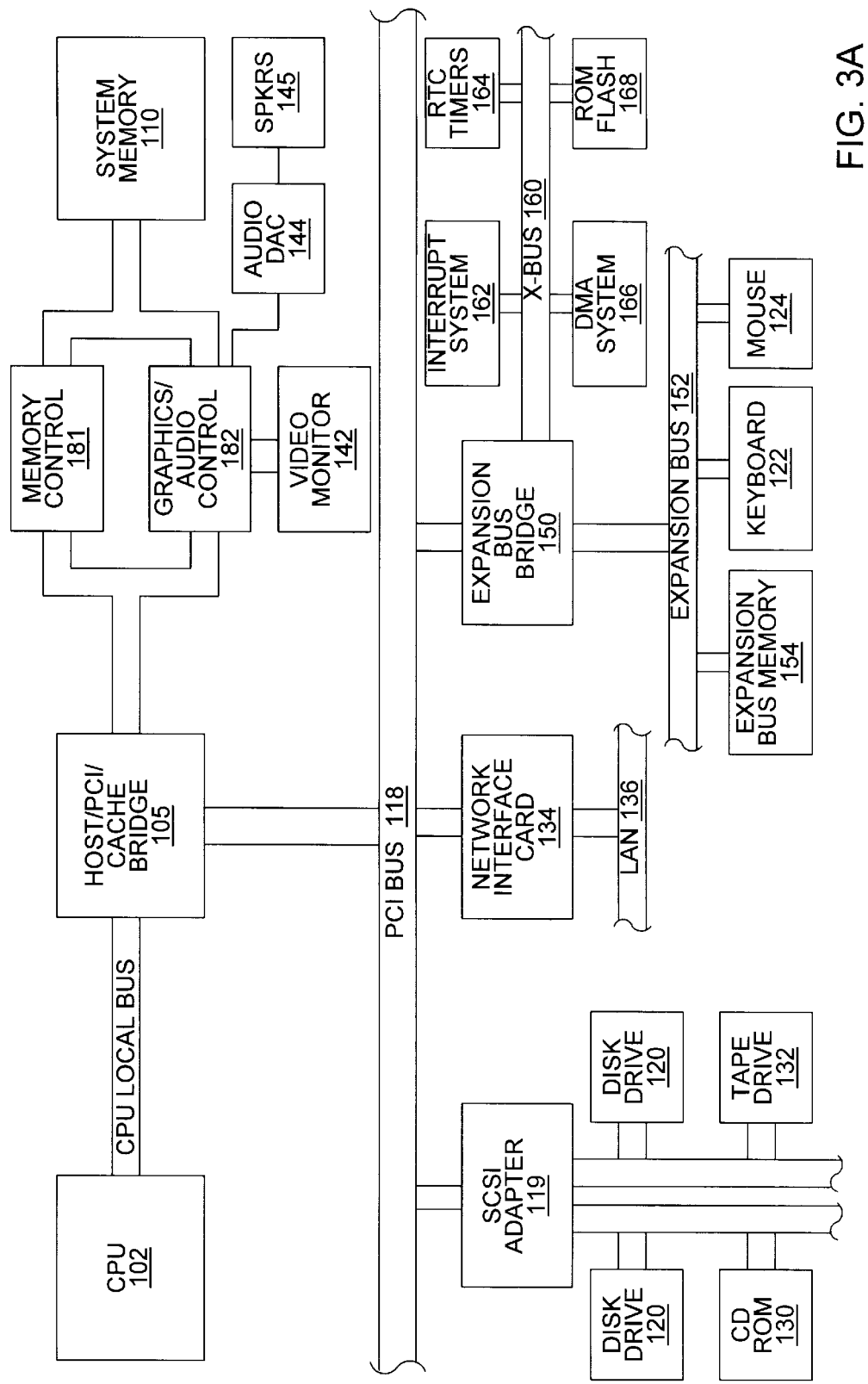
FIG. 3A illustrates an alternate embodiment of the computer system of FIG. 3 including memory control and graphics/audio blocks coupled to the system memory.

FIG. 3A illustrates an alternate embodiment of the computer system of FIG. 3 including memory control and graphics/audio blocks coupled to the system memory 110. In this embodiment, the host/PCI/cache bridge 105 couples to a memory control block 181 which couples to system memory 110. The host/PCI/cache bridge 105 also couples to a graphics/audio control block 182 which couples to system memory 110. Video monitor 142 and audio DAC 144 are coupled to the graphics/audio block 182. Speakers 145 connect to the Audio DAC 144. Thus, in this embodiment, the internal logic of the IMC 140 is split into two chips 181 and 182, one comprising the memory control logic 181 and the other comprising the graphics/audio control logic 182. This embodiment is preferably used where it is impractical to include both the memory and graphical capabilities of the IMC 140 of the present invention on a single chip.

Figure 3B:
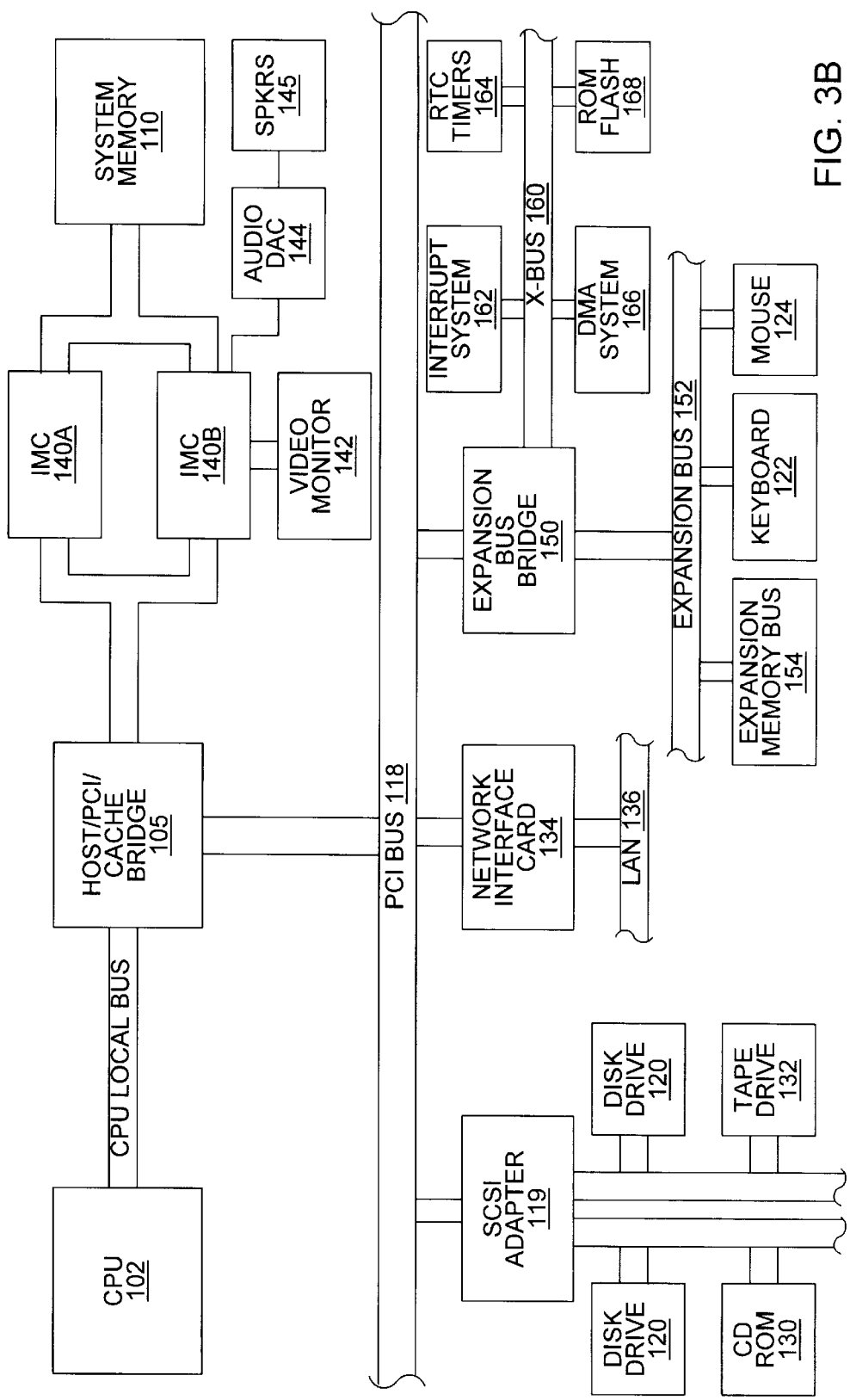
FIG. 3B illustrates an alternate embodiment of the computer system of FIG. 3 including two IMCs coupled to the system memory.

FIG. 3B illustrates an alternate embodiment of the computer system of FIG. 3 including two IMCs 140a and 140b coupled between the host/PCI/cache bridge 105 and the system memory 110. In one embodiment the IMC 140a is used solely for memory control functions and the IMC 140b is used solely for graphical and audio functions. Alternatively, the IMCs 140a and 140b each perform both memory and graphics/audio functions for increased performance. For example, the video monitor 142 may optionally be coupled to both IMCs 140a and 140b.

Figure 3C:
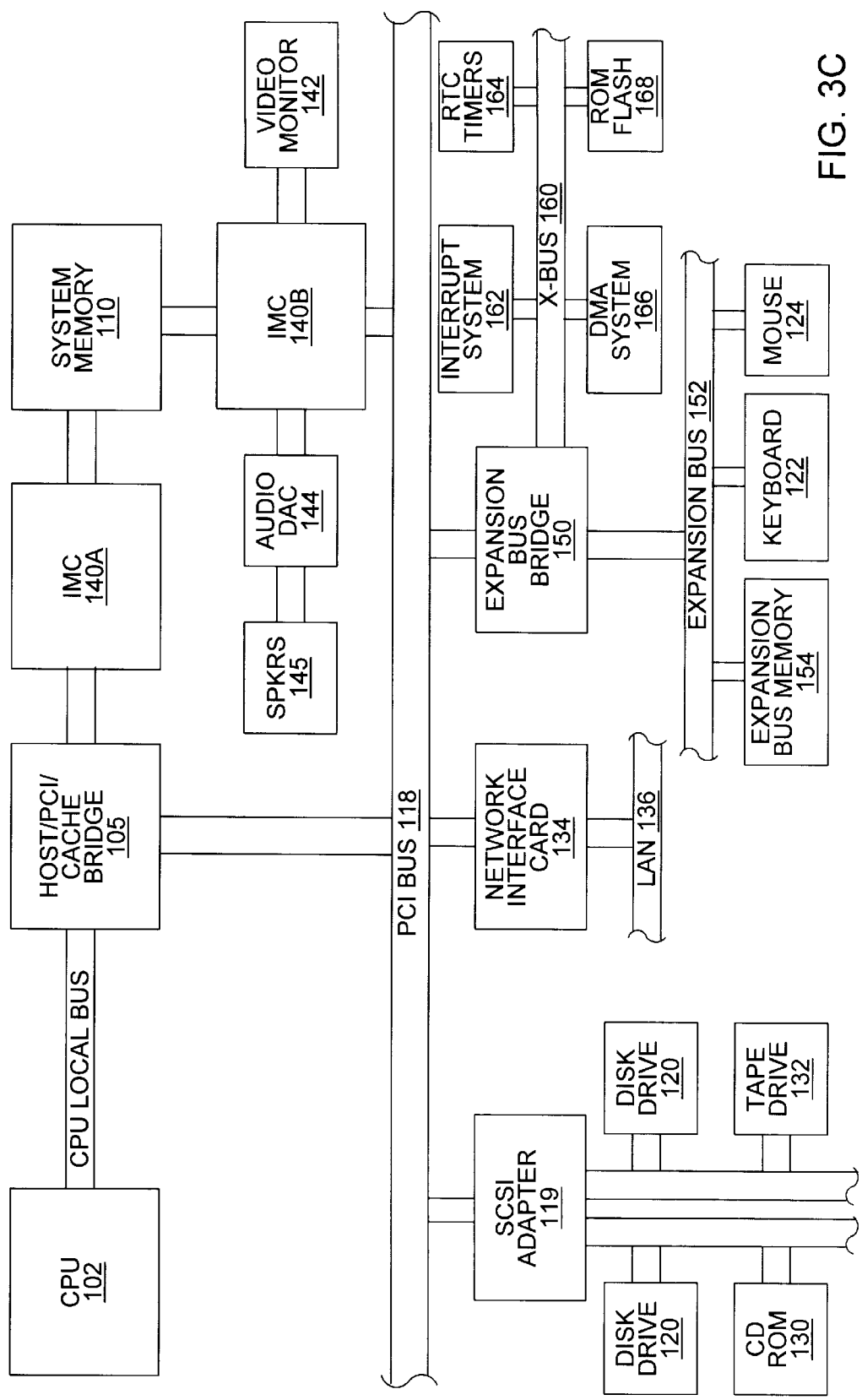
FIG. 3C illustrates an alternate embodiment of the computer system of FIG. 3 including a first IMC coupled to the cache bridge which couples to system memory and a second IMC coupled to the PCI bus which couples to system memory.

FIG. 3C illustrates an alternate embodiment of the computer system of FIG. 3 including a first IMC 140a coupled between the host/PCI/cache bridge 105 and the system memory 110. A second IMC 140b is coupled to the PCI bus 118, and the second IMC 140b also couples to the system memory 110. Video monitor 142 and Audio DAC 144 are coupled to the IMC 140b and speakers 145 connect to the Audio DAC 145. Alternatively, the first IMC 140a can simply be a memory controller without graphical or audio capabilities.

Figure 3D:
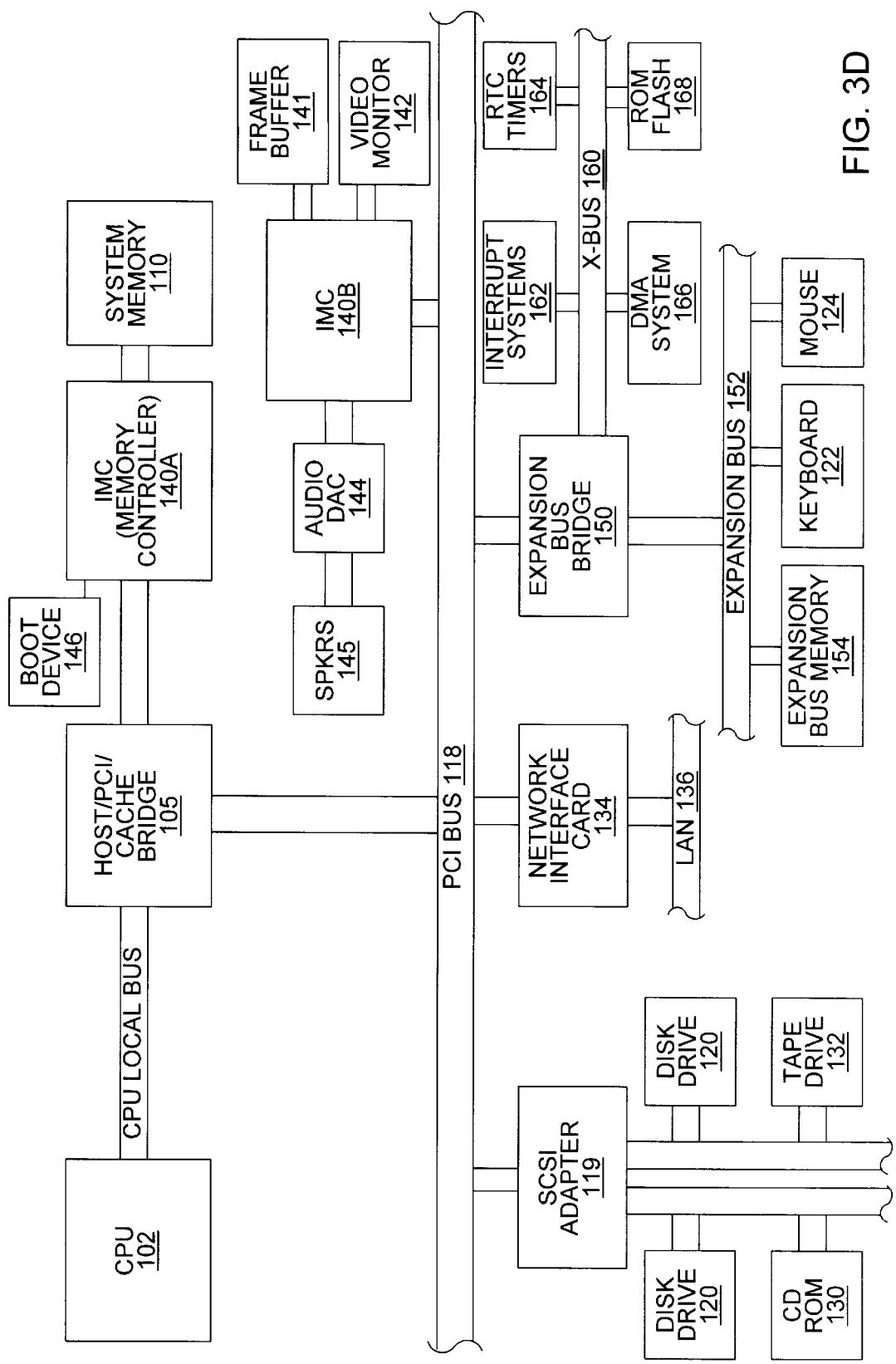
FIG. 3D illustrates a computer system including the IMC and using a prior art architecture where the IMC couples to the PCI bus and uses a separate frame buffer memory for video data.

FIG. 3D illustrates a computer system including the IMC and using a prior art architecture similar to that of FIG. 1. A first IMC 140a or memory controller is coupled between the host/PCI/cache bridge 105 and the system memory 110. A second IMC 140b couples to the PCI bus 118. A frame buffer 141 separate from system memory 110 is coupled to the IMC 140b. Video monitor 142 and Audio DAC 144 are coupled to the IMC 140b and speakers 145 connect to the Audio DAC 145. This embodiment does not have many of the same advantages as the embodiments described above because a separate frame buffer 141 is used. Also, this system requires graphical data or pixel data transfers between the system memory 110 and the frame buffer 141, which are not required in the above systems. Alternatively, the computer system includes a dedicated (non-IMC) memory controller, and the IMC 140 is used as the graphics accelerator in the graphics adapter 112.

IMC as a Bus Master

In the preferred embodiment, the IMC 140 is a system bus master, thus providing a better cost/performance ratio. In the preferred embodiment of FIG. 3, the IMC 140 can act as a master on the PCI bus 118 in a similar manner that the CPU 102 acts as a master on the PCI bus 118. In one embodiment, the PCI/cache bridge 105 includes arbitration logic, and the CPU 102 and the IMC 140 arbitrate for control of the PCI bus 118. As is well known, a PCI master is able to initiate burst mode or DMA data transfers onto or off-of the system bus, and such transfers minimize the amount of work the CPU 102 and IMC 140 must perform to move data around the system. Since the IMC 140 is a PCI master, memory acquisition or data transfers of certain data-types which are stored in permanent storage (disks) or across the network (LAN) do not consume CPU resources. It is noted that the CPU 102 must service the request to transfer, (IMC register initialization for the transfer). However, the CPU 102 is not required to actually perform the data transfer once the link has been established, and thus CPU processing time is saved. In the preferred embodiment where the IMC 140 is a bus master, once the CPU 102 has set up the data transfer, data movement is controlled by the IMC 140. In this case the IMC 140 may be tasked with decompression of data coming off of the system hard drive. Another example is an external MPEG decoder for live video. Once initialized, the IMC 140 moves and prepares the data for display without CPU intervention. With the IMC's ability to control transfer, decompression and display, the CPU 102 is not required to use processing power in order to transfer data between subsystems.

IMC Interface

Figure 4:
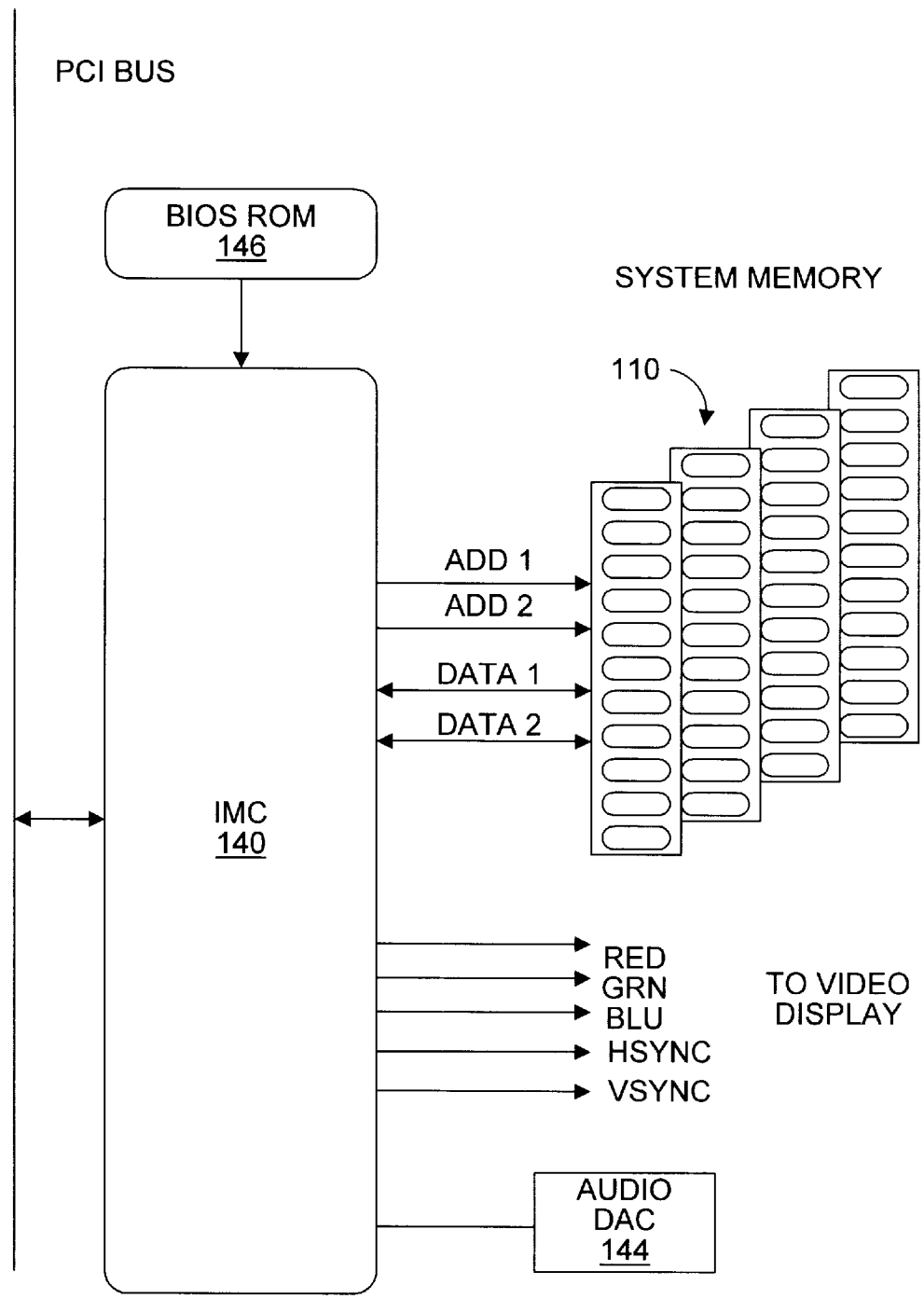
FIG. 4 is a block diagram illustrating the IMC interfacing to system memory and a video display monitor.

Referring now to FIG. 4, a block diagram illustrating how the IMC 140 interfaces to various devices is shown. In the embodiment shown in FIG. 4, the IMC 140 is coupled to a PCI bus wherein the PCI bus is the system bus 106. However, in the preferred embodiment, the IMC 140 is coupled to an expansion bus/cache bridge 105, as shown in FIG. 3. An external BIOS ROM 146 is coupled to the IMC 140 for boot and initialization of the computer system. As mentioned above, in the preferred embodiment the IMC 140 includes dual memory control units for connection of up to 512 Megabytes of system memory. Each memory control unit generates respective address and data signals as shown. For example, a first memory control unit generates address and data signals (Add1 and Data1) and a second memory control unit also generates address and data signals (Add2 and Data2). In an alternate embodiment, the IMC 140 includes a single memory control unit. The IMC 140 also generates the appropriate video signals for driving the video display monitor 142. As shown, the IMC 140 generates red, green and blue signals referred to as red, grn and blu, for driving the video display monitor 142 and generates horizontal and vertical synchronization signals referred to as HSYNC and VSYNC, respectively. The IMC 140 further generates audio signals to an Audio DAC 144, which in turn provides analog audio signals to one or more speakers (not shown).

IMC System Boot Procedure

The BIOS ROM 146 stores boot data, preferably in a compressed format. At power-up, the IMC 140 reads and decompresses the BIOS data from the BIOS ROM 146 into a normal format and loads the data into the system memory 110. In the preferred embodiment, all memory accesses are suspended until the boot code has been transferred to the system memory 110 and is ready to be read. All internal IMC mapping registers default to point to the boot code for power on operation. Once the boot code has been loaded into system memory 110, the CPU 102 traps the starting address of the boot code to begin boot operations.

The boot code is responsible for a number of configuration options of the IMC 140. When a reset input to the IMC 140 referred to as nRESET goes inactive high, configuration resistors tied to inactive signals determine the start up procedures. If the configuration is set to boot from the IMC boot code, the data is read by the IMC 140, optionally decompressed, and transferred into the system memory 110. Before this operation can take place, the IMC 140 must also be programmed. When the boot device 146 is connected to the IMC 140, the first portion of the boot code is specific to the IMC 140. This code is read from the boot device 146 into the IMC instruction register FIFO. IMC instructions such as load and store registers set up the initialization of the IMC. These operations include but are not limited to: set refresh, map PCI memory bounds, initialize display timing, and read main CPU boot code to specific system memory address. In addition, if the boot code is in a compressed format, the IMC initialization routine sets up the IMC for decompression of such code. It is noted that all boot code for the IMC is in a "non-compressed" format. Once the system boot and driver have been initialized, the IMC protocol for instruction processing can be in a compressed format.

Once the boot code is transferred to the system memory 110 by the IMC 140, an NMI or high level interrupt is generated from the IMC interrupt output pin. Optionally, the IMC can communicate a "NOT READY" status to the CPU 102 to prevent access until the boot memory 146 is in place. After the IMC 140 has set the memory bounds and configured the PCI interface configuration, set display and memory refresh timings, decompressed and/or loaded host CPU boot code into system memory, an interrupt out instruction from the IMC 140 directs the host CPU 102 to begin instruction execution for completion of system initialization.

Non-IMC System Boot Procedure

In an alternate embodiment, the computer system does not include a boot device coupled to the IMC boot device port. In this embodiment, the IMC 140 resides in the system as a coprocessor. A waiting register loads into the IMC 140 to enable access to the main memory 110. In an embodiment where the IMC 140 is coupled to the PCI bus, the IMC 140 contains the correct configuration information in order for the system to recognize the IMC 140 as a PCI peripheral device. In this architecture the host CPU 102 is responsible for register loads to initialize the IMC 140. Such initialization sets up the decode memory map for non-compressed and compressed data storage, as well as the display for output and any other set-up required to boot the operating system.

IMC Block Diagram

Figure 5:
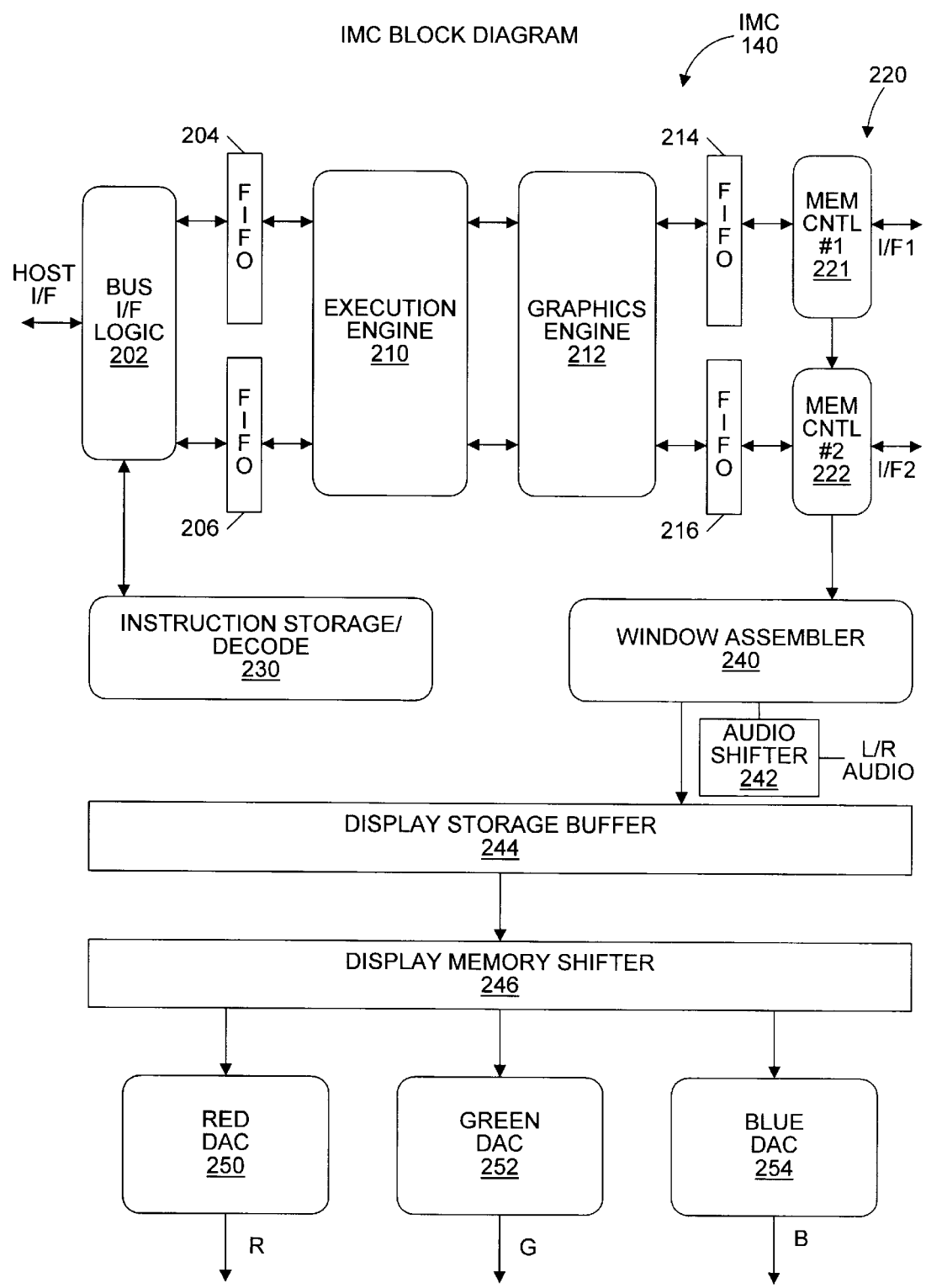
FIG. 5 is a block diagram illustrating the internal architecture of the integrated memory controller (IMC) of the present invention.

FIG. 5 illustrates a more detailed block diagram of the internal components comprising the IMC 140 of the present invention. It is noted that various of the elements in FIG. 5 are interconnected with each other, wherein many of the various interconnections are not illustrated in FIG. 5 for simplicity.

As shown, the IMC 140 includes bus interface logic 202 for coupling to the host computer system, i.e., for coupling to the system bus 106. In the preferred embodiment, the system bus 106 is the CPU bus or host bus. Alternatively, the system bus 106 is the PCI bus, and the bus interface logic 202 couples to the PCI bus. Instruction storage/decode logic 230 is coupled to the bus interface logic 202.

The bus interface logic 202 couples to an execution engine 210 through two first in first out (FIFO) buffers 204 and 206. In other words, the two FIFO buffers 204 and 206 are coupled between the bus interface logic 202 and the execution engine 210. The FIFO buffers 204 and 206 decouple data transfers between the external asynchronous computer system and the synchronous logic comprised within the IMC 140. The execution engine 210 includes a data compression/decompression (codec) engine according to the present invention, as described further below. The execution engine 210 also include texture mapping logic for performing texture mapping on pixel data. In one embodiment, the execution engine 210 includes separate compression and decompression engines.

The execution engine 210 couples to a graphics engine 212. The graphics engine 212 essentially serves as the graphical adapter or graphics processor and includes various graphical control logic for manipulating graphical pixel data and rendering objects. The graphics engine 212 includes polygon rendering logic for drawing lines, triangles, etc., i.e., for interpolating objects on the display screen 142. The graphics engine 212 also includes other graphical logic, including ASCII to font conversion logic, among others. The instruction storage/decode logic 230 stores instructions for execution by the graphics engine 212.

In one embodiment, the execution engine 210 comprises a DSP engine which performs both codec functions as well as graphical functions. In one embodiment, the DSP engine includes one or more ROMs which store different microcode depending on the task being performed, and the DSP engine dynamically switches between different sets of microcode to perform different tasks.

The graphics engine 212 couples to respective memory control units referred to as memory control unit #1 220 and memory control unit #2 222 via respective FIFO buffers 214 and 216, respectively. Memory control unit #1 220 and memory control #2 222 provide interface signals to communicate with respective banks of system memory 110. In an alternate embodiment, the IMC 140 includes a single memory control unit. The graphics engine 212 reads graphical data from system memory 110, performs various graphical operations on the data, such as formatting the data to the correct x, y addressing, and writes the data back to system memory 110. The graphics engine 212 performs operations on data in the system memory 110 under CPU control using the high level graphical protocol. In many instances, the graphics engine 212 manipulates or resets pointers and manipulates data in windows workspace areas in system memory 110, rather than transferring the pixel data to a new location in system memory 110.

The two memory control units 220 and 222 can each preferably address up to 256 Megabytes of system memory 110. Each memory control unit 220 and 222 comprises a complete address and data interface for coupling to system memory 110. Each memory control unit 220 and 222 also includes internal collision logic for tracking of operations to avoid data coherency problems. The memory control units 220 and 222 are coupled internally and include a complete display list of memory operations to be performed. Multiple display lists are used for memory transfers as well as screen refresh and DRAM refresh operations. Both memory control units 220 and 222 span the entire memory interface address space and are capable of reading any data comprised within the system memory 110.

A Window Assembler 240 is coupled to each of the memory control units 220 and 222. The Window Assembler 240 includes logic according to the present invention which assembles video refresh data on a per window or per object basis using a novel pointerbased Display Refresh List method. This considerably improves system and video performance. The Display Refresh List is stored in system memory 110 and uses pointers which reference video data for display. The Window Assembler 240 also uses a respective window workspace located in system memory 110 for each window or object on the display screen 142. In other words, the Window Assembler 240 includes memory mapped I/O registers which point to applications-specific memory areas within the system memory 110, i.e., areas of system memory 110 which are mapped as windows workspace memory. Each window workspace contains important information pertaining to the respective window or application, including the position of the window on the display, the number of bits per pixel or color composition matrix, depth and alpha blending values, and respective address pointers for each function. Thus each window on the display screen includes an independent number of colors, depth, and alpha planes. The information in each respective window workspace is used by the Window Assembler 240 during screen refresh to draw the respective window information on the display screen 142.

Therefore, the system memory 110 includes workspace areas which specify data types, color depths, 3D depth values, screen position, etc. for each window on the screen. A Display Refresh List or queue is located in system memory 110, and the Window Assembler 240 dynamically adjusts and/or constructs the Display Refresh List according to the movement of data objects which appear on the video display screen 142. Thus, when an object or window is moved to a new position on the video screen, the data comprising the object does not transfer to another location in system memory 110. Rather, only the display pointer address is changed in the system memory 110, and this change is reflected in the Display Refresh List. This provides the effect of moving data from a source address to a destination address, i.e., a bit block transfer (bit blit), without ever having to move data comprising the object to a new location in system memory 110. This provides greatly increased performance over conventional bit blit operations commonly used in graphical systems.

The Window Assembler 240 is coupled to a display storage buffer 244 where the screen refresh pixel data is stored. The display storage buffer 244 is coupled to a display memory shifter 246 which in turn is coupled to respective red, green and blue digital to analog converters (DACs) which provide the respective red, green and blue signals to the display unit 142. The IMC 140 also provides horizontal and vertical synchronization signals (not shown in FIG. 4). In one embodiment, the Window Assembler 240 also provides audio signal outputs to an Audio Shifter 242 which provides audio output signals, as shown.

The IMC 140 includes a bursting architecture designed to preferably burst 8 bytes or 64 bits of data during single transfers, and can also burst 32 bit (4 byte) transfers for PCI bus transfers. The IMC 140 also includes logic for single byte and multiple byte operations using either big or little endian formats. The IMC 140 transfers data between the system bus and main memory 110 and also transfers data between the system memory 110 and the internal shift registers 244 and 246 for graphical display output. All data transferred within the IMC 140 is subject to operation within the execution engine 210 and/or the graphics engine 212 as the data traverses through the data path of the IMC 140.

Compression/Decompression Engine

Figure 6:
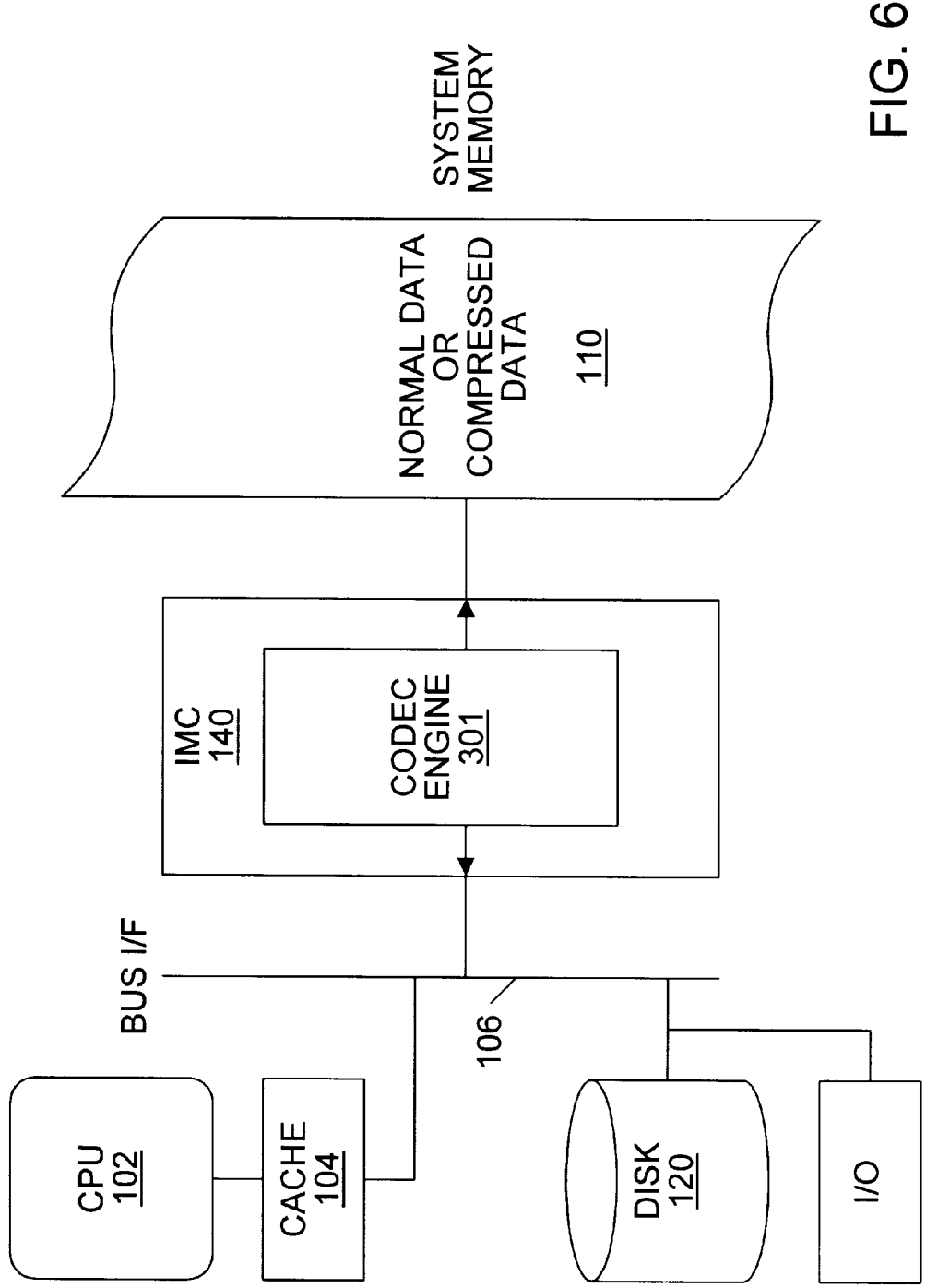
FIG. 6 illustrates the compression/decompression logic comprised in the IMC 140 according to the present invention.

Referring now to FIG. 6, the execution engine 210 preferably includes a single compression/decompression engine 301 which performs compression and decompression functions. This single engine 301 is preferablye a dedicated codec hardware engine. In one embodiment, the codec engine 301 comprises a DSP core with one or more ROMs which store different sets of microcode for certain functions, such as compression, decompression, special types of graphical compression and decompression, and bit blit operations, as desired. In this embodiment, the codec engine 301 dynamically shifts between the different sets of microcode in the one or more ROMs depending on the function being performed.

Figure 6A:
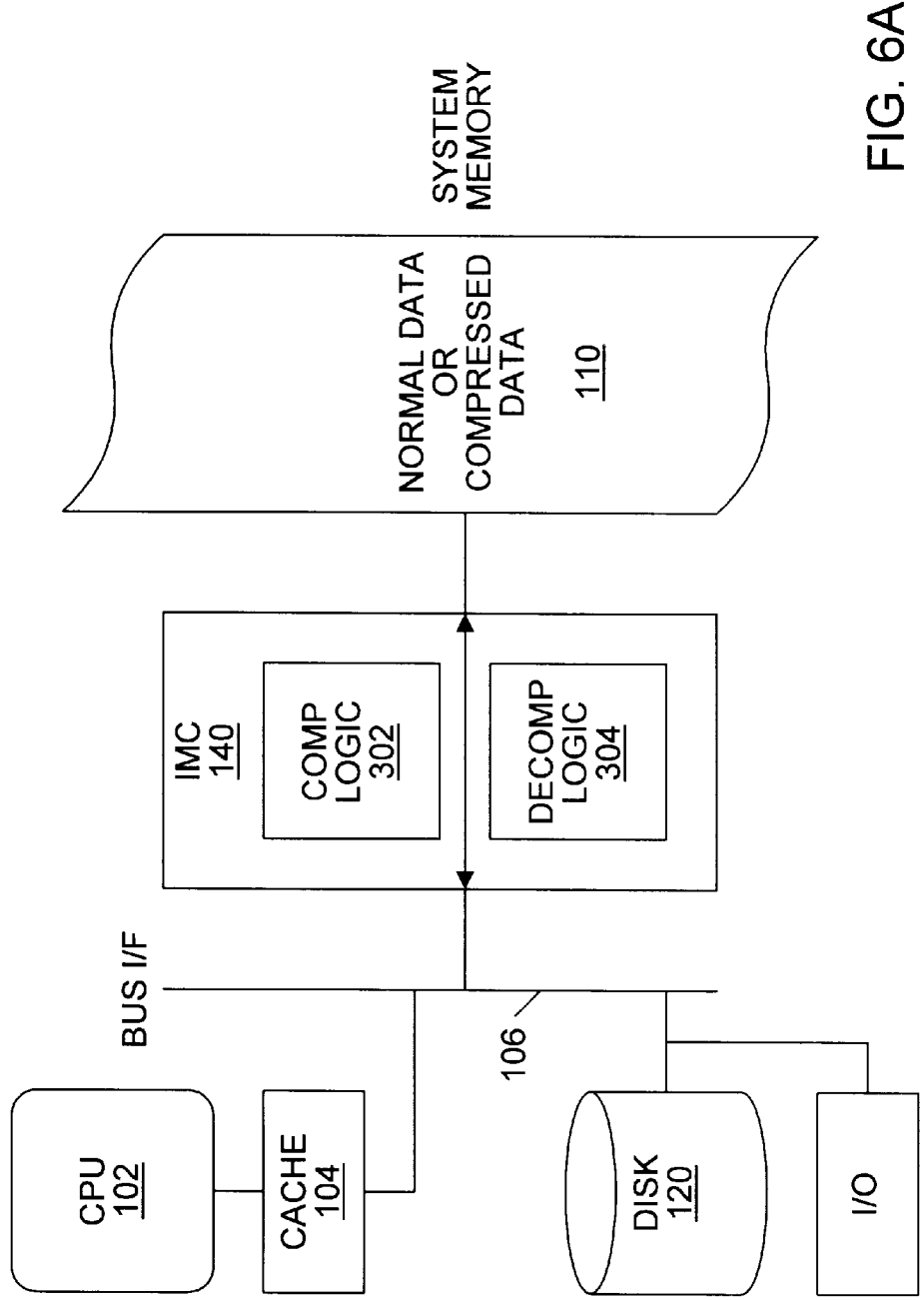
FIG. 6A illustrates an alternate embodiment including separate compression and decompression engines comprised in the IMC 140 according to the present invention.

As shown in FIG. 6A, in one embodiment, the execution engine 210 in the IMC 140 preferably includes an embedded lossless data compression engine 302 and decompression engine 304 designed to compress and decompress data as data is transferred to/from system memory 110. In the following description, the execution engine 210 is described as having separate compression and decompression engines 302 and 304. In the present disclosure, the term "compression/decompression engine" includes a single integrated engine which performs compression and decompression functions as well as separate compression and decompression engines.

Thus, the IMC 140 includes two data formats referred to as "compressed" data and "normal" data. The compressed data format requires less storage and thus is less expensive. The compressed format also requires less system bandwidth to transfer data between system memory 110 and I/O subsystems. Compression of normal data format to compressed data format results in a small performance penalty. However, the decompression of compressed data format to normal data format does not have an associated penalty. In one embodiment, the compression engine 302 is implemented in software by the CPU 102.

In the preferred embodiment, the compression engine 302 and decompression engine 304 comprise hardware engines in the IMC 140, or alternatively use pieces of the same engine for compression and decompression. In the preferred embodiment, the compression engine 302 and decompression engine 304 in the IMC 140 comprise one or more hardware engines which perform LZRW compression and decompression. For more information on a data compression and decompression system using LZRW compression, please see U.S. Pat. No. 4,701,745, titled "Data Compression System," which issued Oct. 20, 1987 and which is hereby incorporated by reference in its entirety. In an alternate embodiment, the data compression and decompression engines 302 and 304 utilize the data compression/decompression processor hardware disclosed in U.S. Pat. No. 5,410,671, titled "Data Compression/Decompression Processor," which issued Apr. 25, 1995 and which is hereby incorporated by reference in its entirety. Other types of data compression/decompression methods may be used. For examples of other data compression/decompression methods which can be used in the hardware engines 302 and 304 of the present invention, please see U.S. Pat. Nos. 4,464,650 and 4,558,302 which are both hereby incorporated by reference. The above two patents present implementations of a data compression method described by Lempel and Ziv in "Compression of Individual Sequences Via Variable-Rate Coding," IEEE Transactions on Information Theory, IT-5, September 1977, pages 530–537, and "A Universal Algorithm for Sequential Data Compression," IEEE Transactions on Information Theory, IT-23-3, May 1977, pages 337–343 and the above two articles are both hereby incorporated by reference.

The compression engine 302 and decompression engine 304 of the present invention may also include specialized compression/decompression engines for image data. For example, one embodiment utilizes compression and decompression engines 302 and 304, which are shown and described in U.S. Pat. No. 5,408,542, titled "Method and Apparatus for Real-Time Lossless Compression and Decompression of Image Data," which issued Apr. 18, 1995 and which is hereby incorporated by reference in its entirety. In an alternative embodiment, the compression and decompression engines 302 and 304 utilize lossy decompression techniques and comprise the system and method taught in U.S. Pat. No. 5,046,119 titled "Method and Apparatus for Compressing and Decompressing Color Video Data with an Anti-Aliasing Mode," this patent being hereby incorporated by reference in its entirety. For related information on compression and decompression engines for video applications, please see U.S. Pat. No. 5,379,356 titled "Decompression Processor for Video Applications," U.S. Pat. No. 5,398,066 titled "Method and Apparatus for Compression and Decompression of Digital Color Images," U.S. Pat. No. 5,402,146 titled "System and Method for Video Compression with Artifact Dispersement Control," and U.S. Pat. No. 5,379,351 titled "Video Compression/Decompression Processing and Processors," all of which are hereby incorporated by reference in their entirety.

For other types of data compression and decompression methods which may be used in the compression and decompression engines 302 and 304 of the present invention, please see U.S. Pat. No. 5,406,279 titled "General Purpose, Hash-Based Technique for Single Pass Lossless Data Compression," U.S. Pat. No. 5,406,278 titled "Method and Apparatus for Data Compression Having an Improved Matching Algorithm which Utilizes a Parallel Hashing Technique," U.S. Pat. No. 5,396,595 titled "Method and System for Compression and Decompression of Data."

In the preferred embodiment of the invention, the compression engine 302 and decompression engine 304 use a lossless compression method. Any of various lossless compression methods may be used as desired. As noted above, in the preferred embodiment, LZRW compression is used as shown in U.S. Pat. No. 4,701,745. However, it is noted that other lossless compression methods may be used, and in some embodiments lossy compression methods may be used as desired.

In the preferred embodiment of the invention, the compression engine 302 and decompression engine 304 are hardware engines comprised of logic circuitry. In an alternate embodiment, the compression and decompression engines 302 and 304 include a dedicated compression/decompression processor which executes instructions out of a ROM or RAM memory. Various other implementations may be used to embed a compression/decompression within the memory controller according to the present invention.

According to the present invention, a software subroutine executing on the CPU 102 directs the IMC to compress data before the data is written to system memory 110 or hard disk 120. This is preferably accomplished after the compilation period of the software and thus does not affect the performance of run time executables. During program execution, the compressed data, in the form of either executables or data files, is decompressed by the decompression engine 304 in the IMC 140 as data is retrieved from the system memory 110. Data stored in compressed format either on the hard disk 120 or on other I/O subsystems such as a LAN (local area network), serial ports, etc., is transferred to the system memory 110 and is either decompressed to normal data by the decompression engine 304 in the IMC 140 during the transfer or is stored as compressed data in the system memory 110 for later decompression.

The operation of the compression unit 302 and the decompression unit 304 in the IMC 140 are completely transparent to system level application software. According to the present invention, special directives are included in the computer's operating system software which imbed directives used in file and data transfers, where the directives are used by the IMC 140 for data manipulation. In this manner, the IMC 140 predicts the necessary data manipulation required, i.e., compression or decompression, ahead of the actual execution requirements of the software application. This system level architecture provides a mechanism for the determination of when and how data is to be transferred and the particular data format, either normal or compressed format, in which the data is to be represented. Software overrides may also be included in software applications in systems where it is desired to control decompression of data at the software application level. In this manner, an additional protocol for data compression or decompression is not required.

Data decompression is particularly important for live video system throughput and texture map storage. In prior art computer systems, live video is limited by the data transfer rate of the raw digital video data between the storage device, the system bus, and the system memory 110 or video subsystem. The IMC 140 of the present invention provides video acceleration with minimal CPU overhead because the IMC 140 decompresses the incoming video data. It is noted that the IMC 140 requires external video input digitization for live video. The IMC 140 also may require an external device for compression of some video formats, such as MPEG.

In addition, while incoming video input is received by the IMC 140, decompressed, and transferred to the hard disk 120 or other I/O device, the video data may also be stored in normal format in the system memory 110 for immediate display on the video monitor 142. The video data stored in the system memory 110 is displayed according to the refresh display list system and method of the present invention comprised in the Window Assembler 240. Thus, this provides the mechanism for receiving video, storing it in compressed format on the disk 120, and also displaying the live video on the display screen 142 in real time during video capture with minimal CPU involvement. Also, as discussed further below, the pointer-based display list video refresh system and method of the present invention provides greatly improved video display capabilities than that found in the prior art. In the 3-D video game market large amounts of memory storage are required to store and manipulate texture images for texture mapping. By storing the texture source (or texels) in compressed format, the IMC 140 reduces both hard disk and memory capacity requirements. The IMC 140 can then be directed by the CPU 102 to expand the compressed textures before texture mapping of display objects is required.

Figure 7:
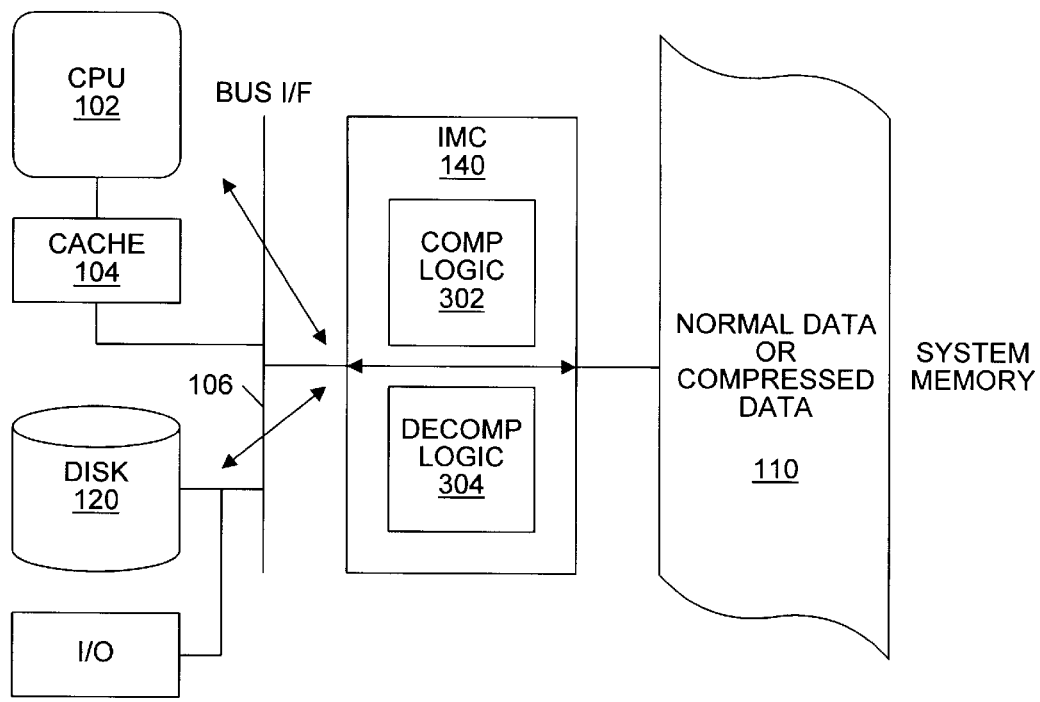
FIG. 7 illustrates normal or compressed data transfers in a computer system incorporating the IMC where the IMC does not modify data during the transfer.

FIGS. 7–15 illustrate various examples of data compression, data decompression, and data transfer within a computer system including an IMC 140 according to the present invention. FIG. 7 illustrates data transfer in either a normal format or compressed format within the computer system without modification by the IMC 140. Thus, the IMC allows data transfers by the system DMA logic or CPU without performing any type of compression or decompression operations, i.e., without any special functions or operations on the data stream. The data is stored in memory or is transferred to the disk or I/O subsystem without any modifications. It is noted that this mode represents the standard prior art method for system data transfer where no compression or decompression operations are performed on the data by the memory controller. In this mode, the IMC 140 is unaware of the data format type and whether the data is for transfer or storage.

Figure 8:
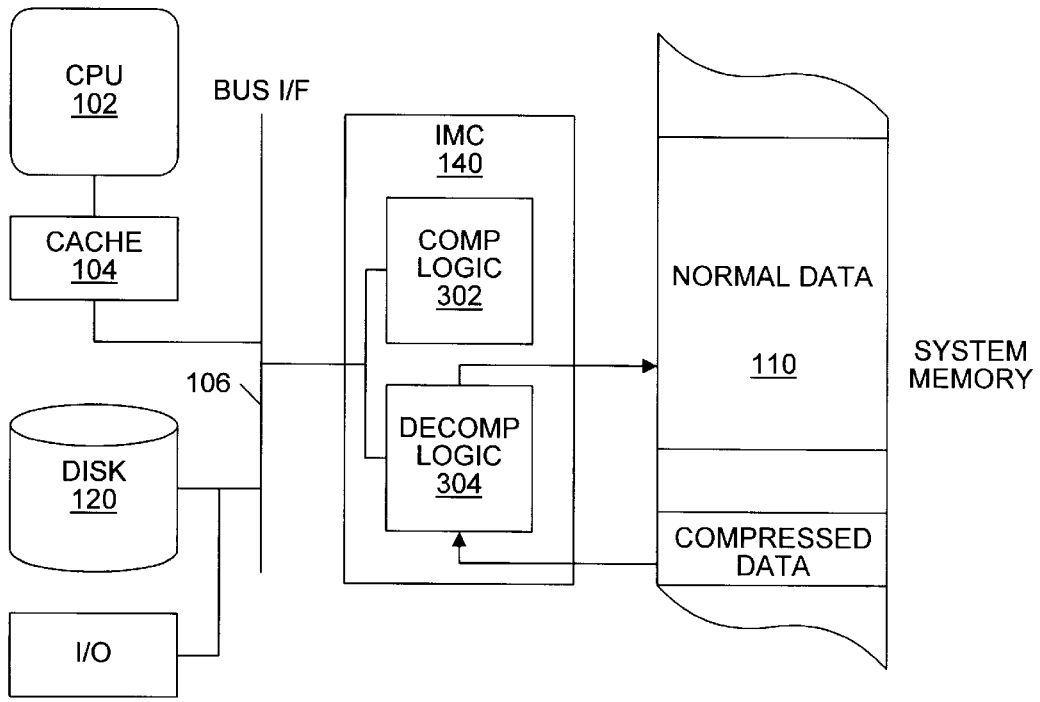
FIG. 8 illustrates a memory-to-memory decompression operation performed by the IMC according to the present invention.

FIG. 8 illustrates a memory-to-memory decompression operation implemented by the IMC 140 according to the present invention. As shown, the IMC 140 performs decompression of data within the system memory 110 without host CPU intervention, i.e., without requiring intervention of software routines executing on the host CPU 102. As shown in FIG. 8, compressed data stored in the system memory is expanded into a normal data format by passing through the decompression engine 304 in the IMC 140. This operation is necessary for preparation of executables which contain instructions and operands directly responsible for CPU program execution. The IMC 140 is directed by initialization code in the form of a malloc instruction to allocate a block for executable storage and to decompress the existing routines already present in the memory subsystem.

Figure 9:
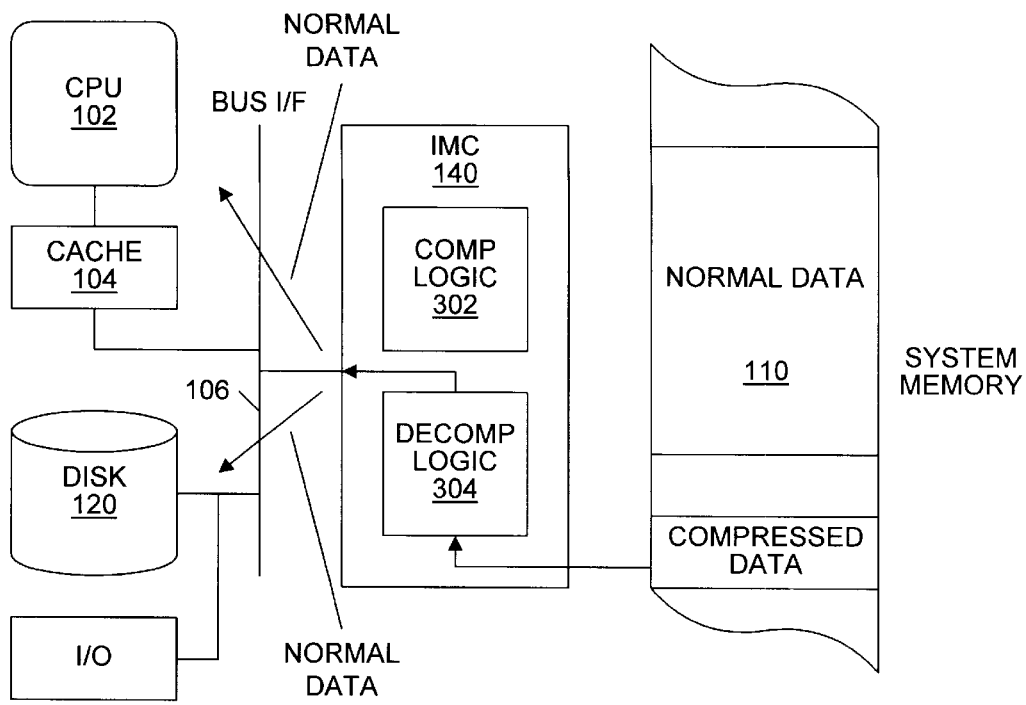
FIG. 9 illustrates a memory decompression operation performed by the IMC on data being transferred to the CPU or to a hard disk according to the present invention.

FIG. 9 illustrates operation of the decompression engine 304 in the IMC 140 obtaining compressed data from the system memory 110, decompressing the data, and transferring the data to the CPU 102 or hard disk 120. Thus, the CPU 102 or hard disk 120 or respective I/O subsystem is capable of reading normal noncompressed data for storage and/or execution from the system memory 110 even when the data stored in system memory is stored in a compressed format. The decompression engine 304 and the IMC 140 operates transparently relative to the remainder of the computer system and operates to transform compressed memory data stored in system memory 110 into noncompressed data or data in the normal format. The decompression operation is transparent and occurs during a read operation from the CPU to system memory 110. The IMC 140 also includes a look ahead architecture system which ensures that the data being read is always available. Thus, stall-out, i.e., the decompression engine 304 failing to keep up with the CPU requests, only occurs when the CPU reads blocks of nonsequential data.

Figure 10:
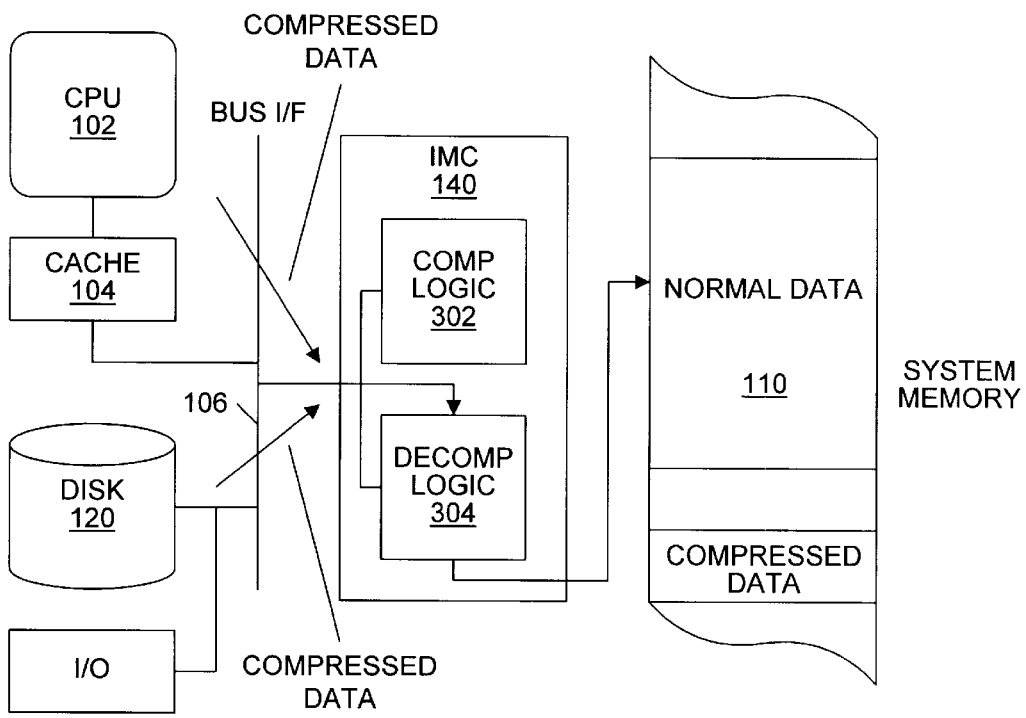
FIG. 10 illustrates decompression of data received from the hard disk or CPU that is transferred in normal format in system memory according to the present invention.

FIG. 10 illustrates operation of the IMC 140 in decompressing data from either the CPU 102 or hard disk 120 and storing the decompressed or normal data into system memory 110. Thus, data can be transferred from hard disk 120 and I/O subsystem or from the CPU 102 can be decompressed and stored in a normal format for later execution or use. This mode of operation is preferably the standard mode. This method allows smaller data files and smaller amounts of information to be transferred on the system bus as data is read from a hard disk 120 or from a local area network (LAN) via a network interface card. The CPU 102 may also obtain and/or move data from a compressed format and store the data in a normal format in the system memory 110 without the CPU 102 having to execute a decompression algorithm in software. This enables executable programs that are stored on the hard disk 120 in compressed format that are transferred by the CPU 102 in compressed format to be expanded within the IMC 140 into a normal format during memory storage.

Figure 11:
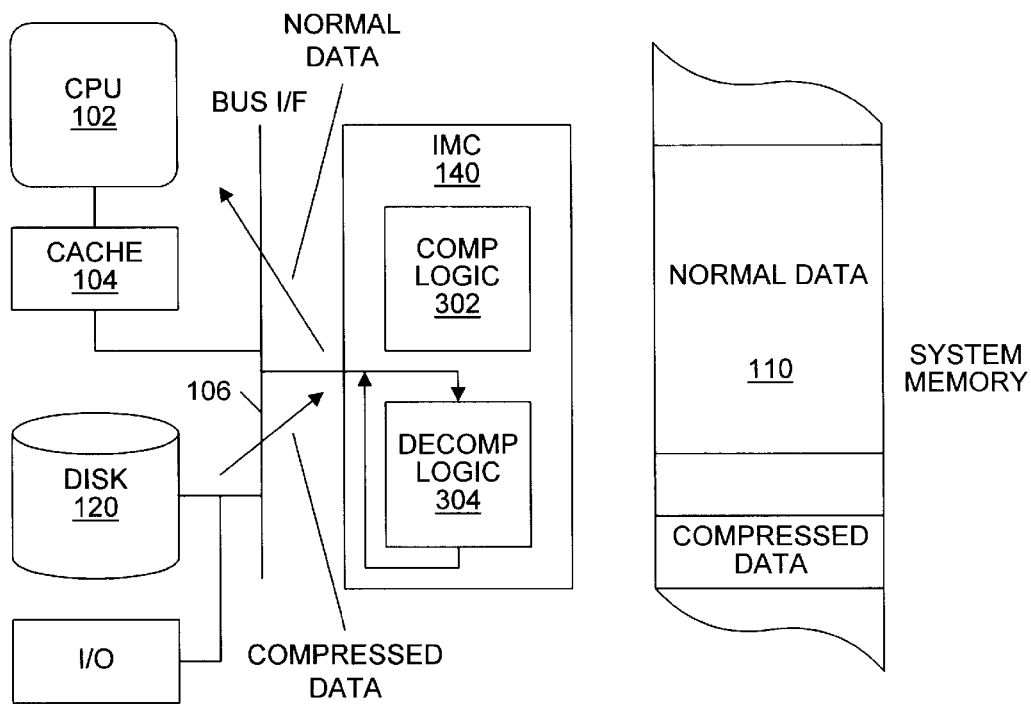
FIG. 11 illustrates operation of the IMC decompressing data retrieved from the hard disk that is provided in normal format to the CPU.

FIG. 11 illustrates compressed data transferred from the hard disk 120 decompressed within the IMC 140 and read as normal data by the CPU 102. This is for cases where it is desirable for the CPU to read data from the hard disk 120 or an I/O subsystem where the data is stored in a compressed format and CPU 102 desires to read the data in a normal format or noncompressed format. The IMC 140 includes a special transfer mode by which the data is not required to be temporarily stored in the system memory 110 in order for decompression to occur. It is noted, however, that the data transfer time may actually be increased in this mode due to the duality of the single interface bus at the interface of the IMC 140. In one embodiment of the invention, the decompression logic 304 includes a dual ported nature with FIFOs at each end wherein compressed data is read into one end and decompressed data is output from the other to increase decompression operations.

Figure 12:
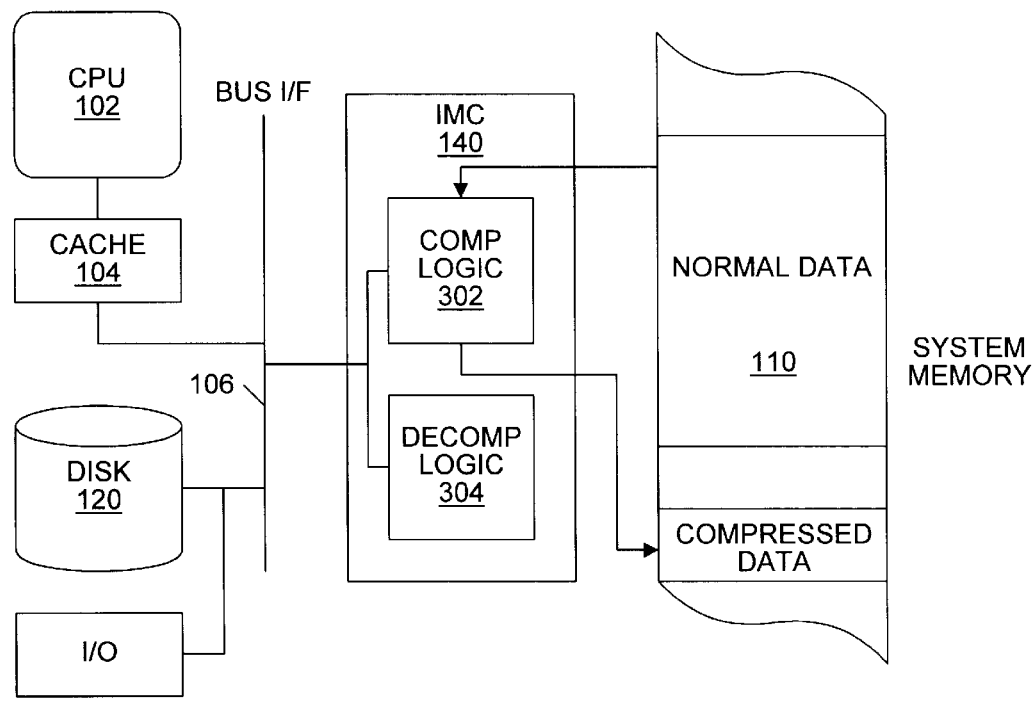
FIG. 12 illustrates a memory-to-memory compression operation performed by the IMC according to the present invention.

FIG. 12 illustrates operation of the IMC 140 in converting normal data, i.e., data in a normal format, in the system memory 110 into data stored in a compressed format within the system memory 110. In one embodiment, the IMC 140 includes a compression engine 302 which accompanies software compression performed by the CPU 102. In some applications, it is faster and more convenient to be able to compress data off line without CPU intervention. This compression operation may generally be used for areas of "cached-out" program or operand data, i.e., data stored in the system memory 110 that is either non-cacheable or is not currently in the cache memory. Thus, the IMC 140 allows for memory compaction during a software application's memory allocation and cleanup routine. FIG. 12 illustrates how the IMC 140 can read data in its normal format from the system memory 110, compress the data, and then write the data back to system memory 110 for later decompression. This is a dynamic operation and can be imbedded into software applications as desired.

Figure 13:
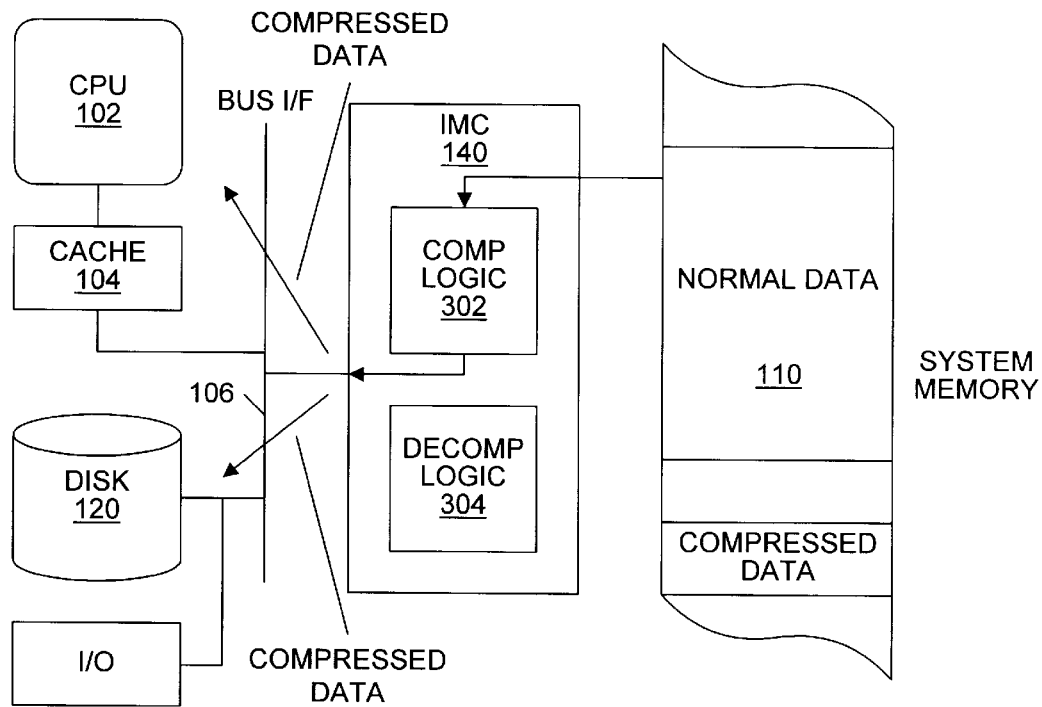
FIG. 13 illustrates operation of the IMC 140 compressing data retrieved from the system memory and providing the compressed data to either the CPU or hard disk.

FIG. 13 illustrates operation of the compression engine 302 in the IMC 140 retrieving data stored in a normal format in the system memory 110 and providing compressed data to either the CPU 102 or the hard disk 120. In a computer system incorporating the IMC 140 according to the preferred embodiment, this operation of the compression engine 302 in transferring data stored in a normal format from system memory 110 and storing the data in a compressed format on the hard disk 120 is preferably one of the most common uses for the IMC compression engine 302.

As shown, data stored in the normal format in the system memory 110 can effectively be "cached" onto the hard disk 120 or an I/O subsystem in compressed format for later use. This method is substantially more efficient than normal data transfers because, due to the compression, the amount of data transferred is less. When a memory miss occurs, i.e., when the CPU requests data from the system memory 110 and the data is not present in the system memory 110 because the data has been stored in a compressed format on the hard disk 120, data in the system memory 110 that has been least recently used is written in compressed format to the disk to make room for the data requested by the CPU 102. Thus, this operation is similar to a cache system where, on a cache miss, the least recently used (LRU) data is overwritten with the requested data because this data is the least likely to be requested in the future. If the CPU 102 includes an internal first level cache system and the cache system 104 is a second level cache system, the system memory 110 effectively acts as a third level cache system storing LRU data in a compressed format in main memory rather than writing the data back to the hard disk 120.

As shown in FIG. 12, instead of transferring the LRU data from system memory 10 to the hard disk 120, the data is not cached to disk but rather is compressed by the compression engine 302 and stored in system memory 110 in compressed format. For example, when a page miss occurs the data is conventionally transferred to the hard disk. However, according to the present invention, the data is stored in system memory 110 in compressed format. This allows faster recall of data when a page miss occurs since the requested data is still in system memory 110, albeit in compressed format.

The compression engine 302 in the IMC 140 provides that only compressed data is transferred between the hard disk 120 and the system memory 110, thus providing substantially faster transfers because of the reduced amount of data required to be transferred. This greatly increases the performance and storage capability of computer systems which implement virtual memory by swapping data from the system memory 110 to and from the hard disk 120. It is further noted that the IMC 140 compresses data stored in the normal format in system memory 110 and transfers this compressed data to the CPU if the CPU 102 desires to obtain the data in a compressed format. It is anticipated that this will not be as common as the transfer of data in a normal format in system memory 110 to a compressed format on the hard disk 120 as described above.

Figure 14:
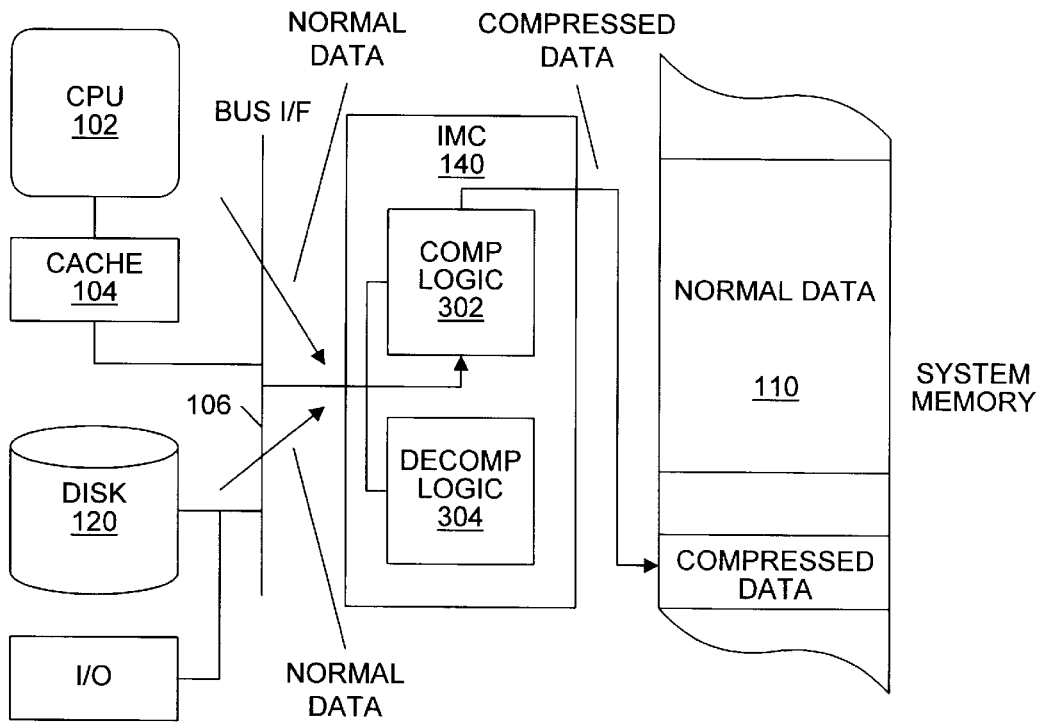
FIG. 14 illustrates compression of data in a normal format received from the CPU or hard disk that is stored in compressed form in the system memory.

FIG. 14 illustrates data in a normal noncompressed format transferred from either the hard disk 120 or CPU 102 to the IMC 140 where the compression engine 302 in the IMC 140 converts the data into compressed data and stores the compressed data in the system memory 110. It is noted that there are generally rare occasions when the hard disk 120, an I/O subsystem, or even the CPU 102 transfers data in normal format to the IMC where it is desirable to store the data in compressed format in the system memory 110. This could typically occur from foreign applications programs loaded into from the floppy drive or retrieved from a local area network where it is desirable to compress this information before use or storage in the main system memory 110. Another usage is for storage of bitmaps and texture maps which must be animated in real time. Here the disk or LAN is too slow to load and register the image data for animation. In this example, the IMC 140 registers compressed bit maps (stored in compressed format on disk) and then uses the method shown in FIG. 8 on an "as needed" basis.

Figure 15:
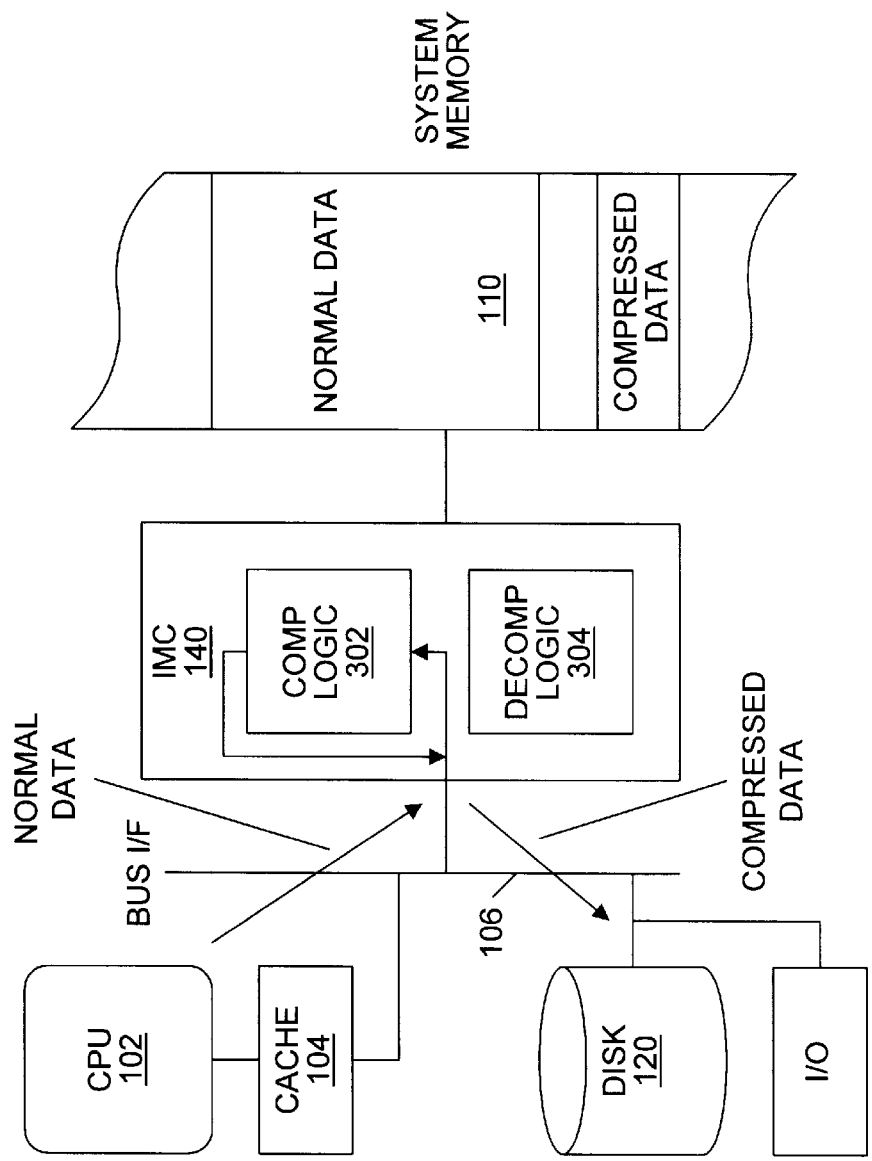
FIG. 15 illustrates operation of the IMC in compressing normal data obtained from the CPU that is stored in compressed form on the hard disk 120.

FIG. 15 illustrates compression of data from the CPU 102 and storage of the compressed data on the hard disk 120 or transferred over another I/O subsystem. Thus, another feature of the compression engine 302 of the present invention is the ability to write CPU data in normal format directly onto the system disk 120 or I/O subsystem in a compressed format. This is performed without requiring the CPU 102 to implement a special software compression algorithm, thus saving CPU resources.

Compression/Decompression Engine for Caching Data in a Compressed Format

The compression/decompression engine 301 in the IMC 140 is also preferably used to cache least recently used (LRU) data in the main memory 110. Thus, on CPU memory management misses, which occur during translation from a virtual address to a physical address, the compression/decompression engine 301 compresses the LRU block of system memory 110 and stores this compressed LRU block in system memory 110. Thus the LRU data is effectively cached in a compressed format in the system memory 110. As a result of the miss, if the address points to a previously compressed block cached in the system memory 110, the compressed block is decompressed and tagged as the most recently used (MRU) block. After being decompressed, this MRU block is now accessible to the CPU 102.

Figure 16:
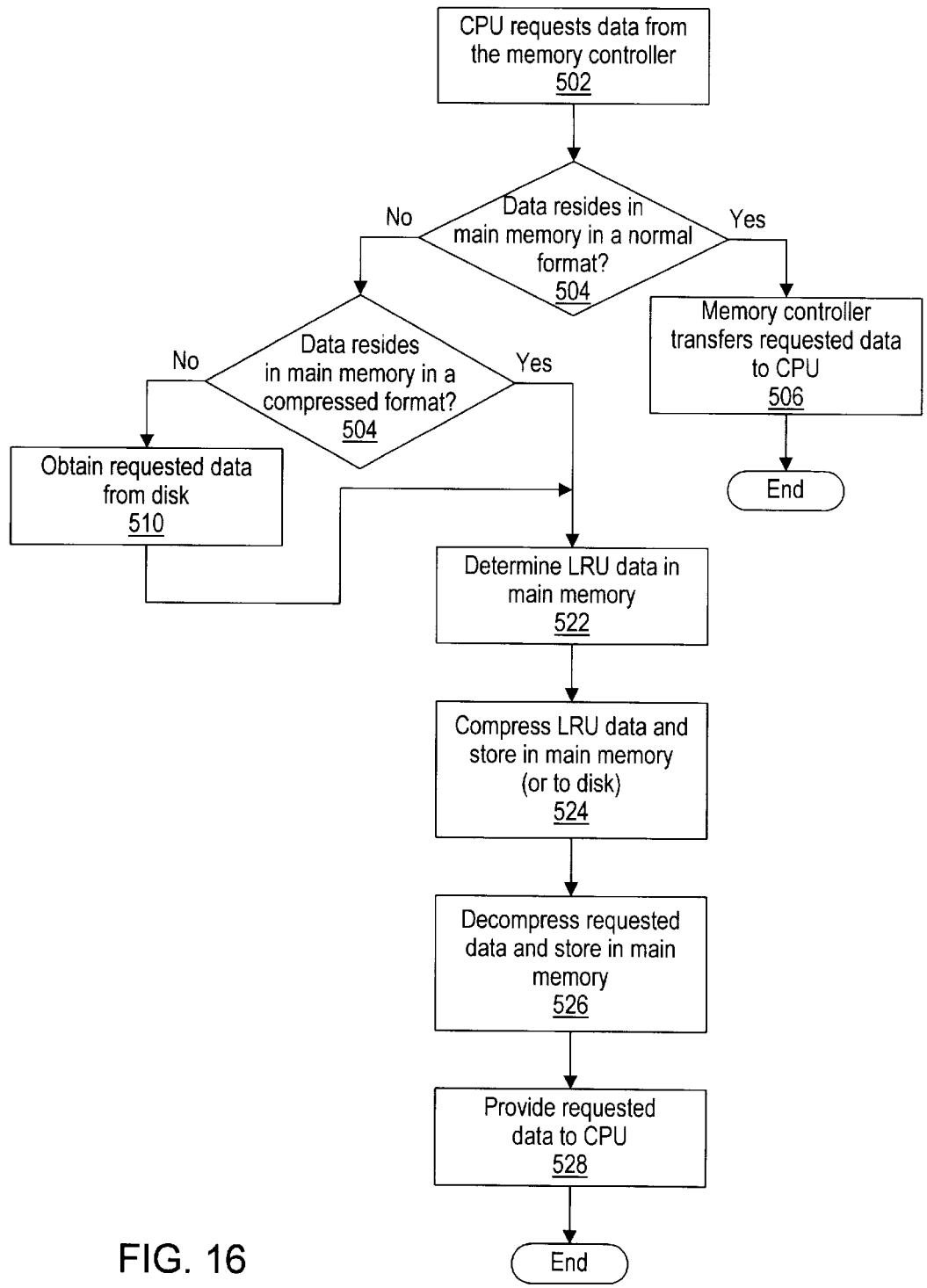
FIG. 16 is a flowchart diagram illustrating operation of a computer system where least recently used data in the system memory is cached in a compressed format to the system memory using the compression/decompression engine of the present invention.

Referring now to FIG. 16, a flowchart diagram is shown illustrating operation of the computer system where the compression/decompression engine is used to store or "cache" LRU data in a compressed format in the system memory 110. In step 502 the CPU 102 requests data from the system memory 110, i.e., the CPU provides addresses of requested data to the IMC 140. In step 504 the IMC 140 determines if the data resides in the main memory 110 in a normal format, i.e., the IMC 140 determines if the data resides in the "system memory cache". If so, then in step 506 the IMC 140 transfers the requested data to the CPU 102, and operation completes.

If the data is determined to not reside in the main memory 110 in a normal format, then in step 508 the IMC 140 determines if the data resides in the main memory 110 in a compressed format. It is noted that the determinations of steps 504 and 508 may essentially be performed in the same step. If the data does not reside in the main memory 110 in a compressed format, then the data must be cached on the disk subsystem 120, and in step 510 the requested data is retrieved from the disk subsystem 120.

If the data resides in the main memory 110 in a compressed format, then in step 522 the IMC 140 determines the least recently used data in main memory 110. Step 522 involves either determining the "true" LRU data or determining "pseudo LRU" data according to a desired replacement algorithm. In the present disclosure, the term "least recently used data" or "LRU data" refers to the data the IMC 140 decides to compress and store (cache) in the system memory 110, presumably because this data was determined to be the least likely to be accessed by the CPU 102 in the future.

In step 524 the IMC 140 compresses the LRU data and stores the compressed LRU data in main memory 110. The compressed LRU data may also be cached to the disk subsystem 120 if additional free system memory space is needed. In step 526 the IMC 140 decompresses the requested data and stores the uncompressed requested data back to main memory 110. The IMC 140 also preferably marks this data as most recently used (MRU) data. In step 528 the IMC 140 provides the requested data to the CPU 102, and operation completes.

It is noted that if the requested data resides in the disk subsystem 120, then the data is retrieved by the IMC 140 in step 510 and steps 522–528 are then performed as described above. In this instance, step 526 is performed only if the data was stored on the disk subsystem 120 in a compressed format, which is typically the case.

The use of the compression/decompression engine to cache LRU data in compressed format in the system memory greatly improves system performance, in many instances by as much as a factor of 10, since transfers to and from disk generally have a maximum transfer rate of 10 Mbytes/sec, whereas the decompression engine can perform at over 100 Mbytes/second.

Mapping System Memory as Compressed and Normal

Under normal operations where the compression/decompression engine is not used, the operating system software maps the IMC 140 as normal "physically addressed" memory. For certain applications it is more advantageous to map the system memory 110 into compressed and normal data storage areas. This allows the operating system to read and write to alternate address ranges where the data is compressed or decompressed during access or operation. This stage is preferably determined by information in an "attributes" list which stores attributes about each window or object on the screen. The attributes list is used by the Window Assembler 240 to maintain information about windows or objects on the screen. For more information on the attributes list and the operation of the Window Assembler 240, please see FIG. 18 and the associated text in U.S. patent application Ser. No. 08/340,667, referenced above.

Figure 17:
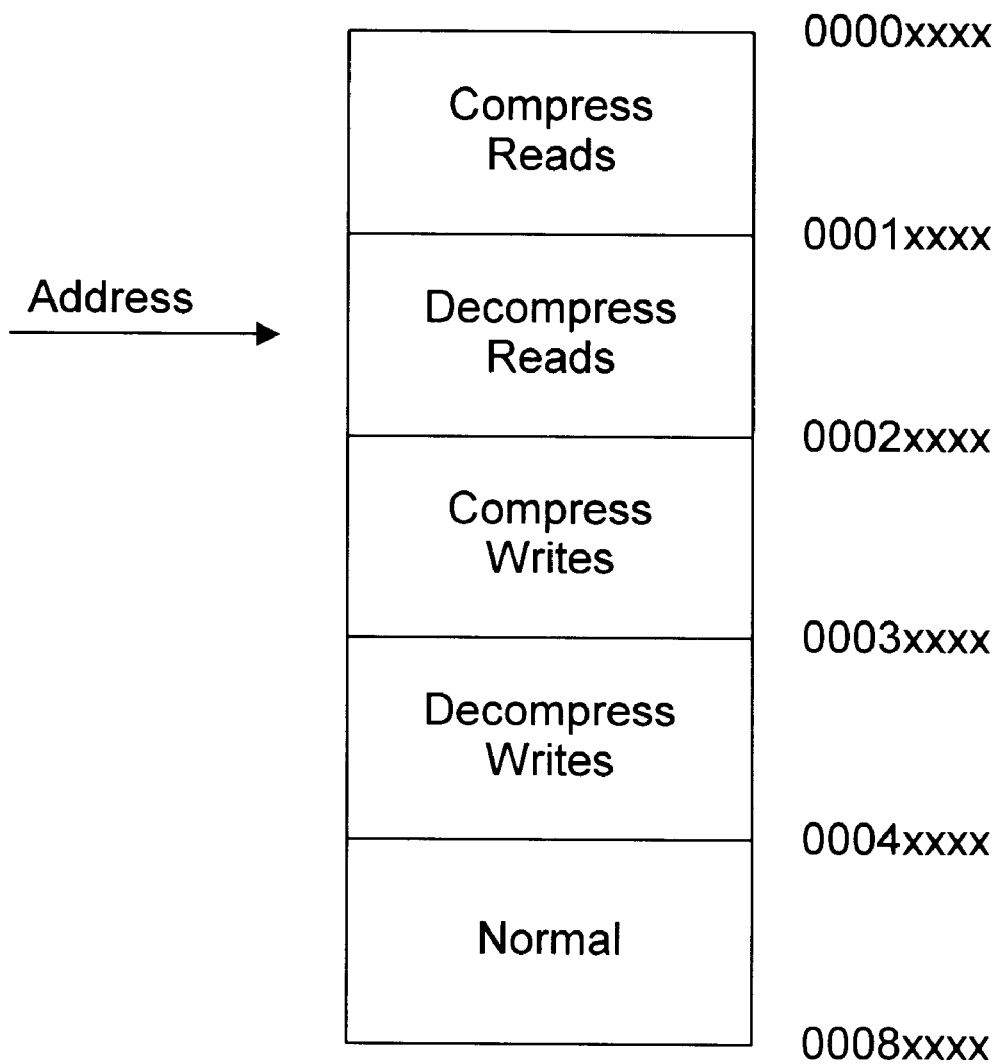
FIG. 17 illustrates memory mapping registers which delineate compression and decompression operations for selected memory address spaces.

FIG. 17 illustrates an example of mapping registers which determine whether the system memory space is mapped into compressed or normal data storage areas. Thus, as the address is input to the mapping registers, the compression/decompression engine is engaged depending on the predefined "locked" memory bounds for each system memory region.

Figure 18:
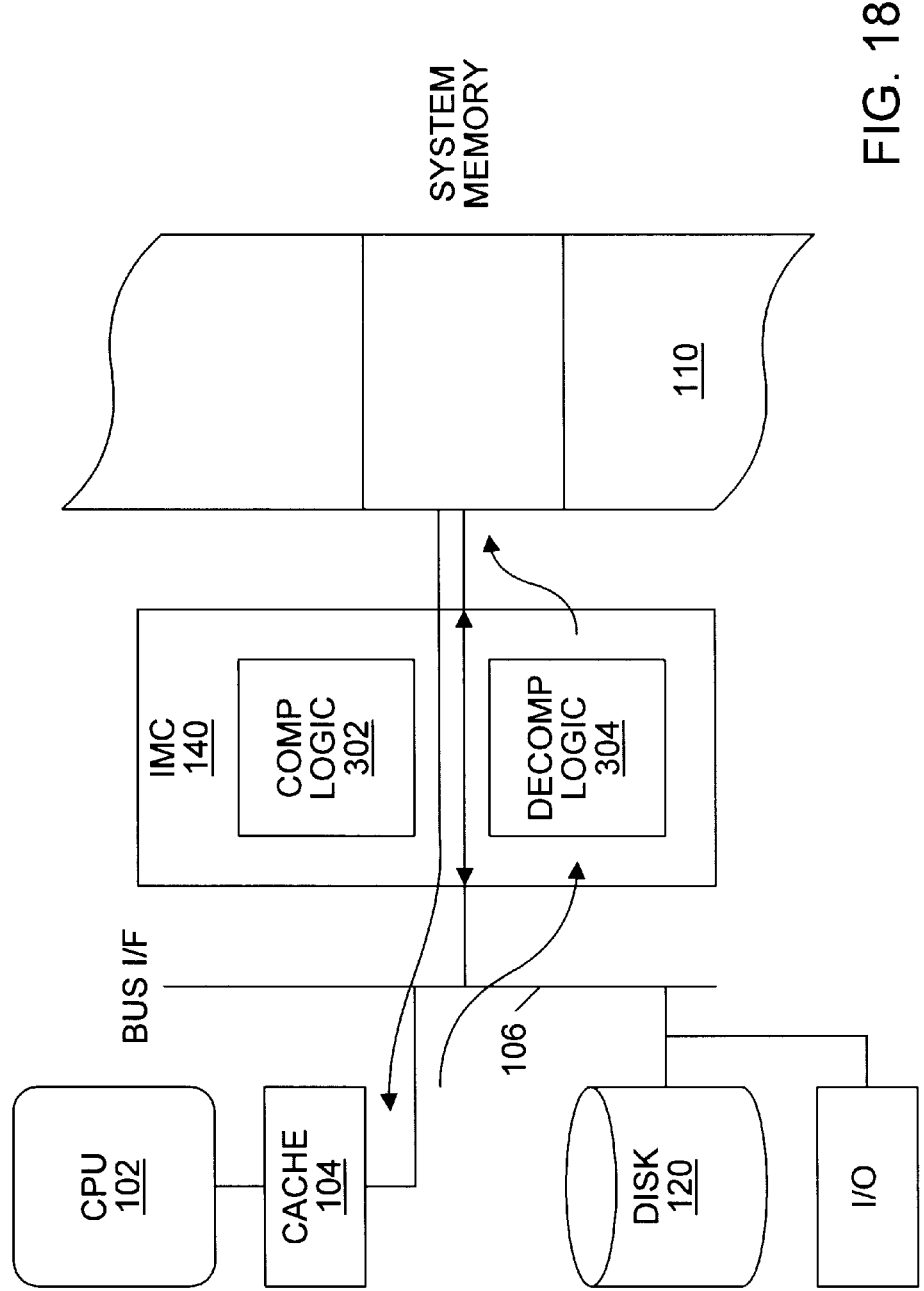
FIG. 18 illustrates read and write operations for an address space shown in FIG. 17.

As shown in FIG. 17, address range 0000xxxx to 0001xxxx is designated with "compress reads", address range 0001xxxx to 0002xxxx is designated with "decompress reads", address range 0002xxxx to 0003xxxx is designated with "compress writes", address range 0003xxxx to 0004xxxx is designated with "decompress writes", and address range 0004xxxx to 0008xxxx is designated with "normal". Thus, if an address is in the range 0003xxxx to 0004xxxx, then reads are normal and writes are decompressed, which is shown in FIG. 18. It is noted that all combinations are possible, including any combination of normal, compressed, and decompressed transfers for reads and writes.

Thus, according to the present invention, the operating system tags system memory 110 for usage. In addition, the IMC 140 maps areas of system memory as compressed or decompressed.

Conclusion

Therefore, the IMC 140 of the present invention includes a compression/decompression engine 301 which off loads work from the CPU 102 and provides increased data transfer capabilities that reduce the amount of data required to be transferred. The IMC 140 of the present invention incorporates compression and decompression in the memory subsystem and thus off loads the host CPU 102 from having to perform this function. Thus, as shown above, multiple choices are available for cost and performance enhancements, and the IMC of the present invention provides numerous advances over the prior art.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for managing memory accesses in a system including a CPU, a system memory for storing data, and a memory controller coupled to the system memory, wherein the memory controller performs memory control functions for the system memory, wherein the memory controller includes a hardware compression and decompression engine, the method comprising:

the CPU initiating an access of data in the system memory, wherein the system memory is a volatile memory which stores uncompressed data currently being used for execution by the CPU, wherein the uncompressed data includes most recently used data;

determining a replacement block of data in the system memory after said initiating;

the memory controller compressing said replacement block of data;

the memory controller storing said compressed replacement block of data in said system memory after said compressing said replacement block of data;

wherein said compressing said replacement block of data and storing said compressed replacement block of data in said system memory operates to free up at least a portion of said system memory;

the memory controller performing said access of data in the system memory.

2. The method of claim 1, wherein the CPU initiating an access of data in the system memory comprises the CPU initiating a read of requested data in the system memory, wherein the memory controller performing said access of data in the system memory includes:
the memory controller providing said requested data to the CPU.

3. The method of claim 2, wherein the requested data resides in the system memory in a compressed format, wherein the memory controller providing said requested data to the CPU includes:
the memory controller decompressing said requested data after the CPU initiating the access to produce uncompressed requested data; and
the memory controller storing said uncompressed requested data in the system memory.

4. The method of claim 3, further comprising:
marking said uncompressed requested data as most recently used data.

5. The method of claim 2, further comprising:
marking said requested data as most recently used data.

6. The method of claim 2, wherein the computer system includes a non-volatile memory coupled to the memory controller, wherein the requested data resides in the non-volatile memory, wherein the memory controller performing said access of data in the system memory comprises:
the memory controller accessing said requested data from the non-volatile memory; and
the memory controller storing said requested data in the system memory.

7. The method of claim 2, wherein the computer system includes a non-volatile memory coupled to the memory controller, wherein the requested data resides in the non-volatile memory in a compressed format, wherein the memory controller performing said access of data in the system memory comprises:
the memory controller accessing said requested data from the non-volatile memory;
the memory controller decompressing the requested data to produce uncompressed requested data; and
the memory controller storing said uncompressed requested data in the system memory.

8. The method of claim 1, further comprising:
marking said data as most recently used data.

9. The method of claim 1, wherein the CPU initiating an access of data in the system memory comprises the CPU initiating a write of first data to the system memory, wherein the memory controller performing said access of data in the system memory comprises:
the memory controller writing said first data to the system memory after the memory controller compressing said replacement block of data and storing said compressed replacement block of data in said system memory.

10. The method of claim 9, further comprising:
marking said first data as most recently used data.

11. The method of claim 1, wherein the CPU initiating an access of data in the system memory comprises the CPU initiating a write of first data to the system memory, wherein the memory controller performing said access of data in the system memory comprises:
the memory controller compressing the first data to produce compressed first data; and
the memory controller writing said compressed first data to the system memory after the memory controller compressing said replacement block of data and storing said compressed replacement block of data in said system memory.

12. The method of claim 1,
the memory controller determining if the data resides in the system memory in an uncompressed format in response to the CPU initiating the access of data in the system memory;
wherein the memory controller compresses the replacement block of data and stores the compressed replacement block of data in the system memory in response to the memory controller determining that the data does not reside in the system memory in an uncompressed format.

13. The method of claim 12,
wherein the memory controller determining if the data resides in the system memory in an uncompressed format comprises the memory controller determining if a page hit occurs;
wherein the memory controller compresses the replacement block of data and stores the compressed replacement block of data in the system memory in response to the memory controller determining that a page miss has occurred.

14. The method of claim 1, wherein the memory controller compressing said replacement block of data comprises the memory controller performing a lossless compression on said replacement block of data.

15. The method of claim 1, wherein the memory controller compressing said replacement block of data comprises the memory controller performing a lossy compression on said replacement block of data.

16. The method of claim 1, wherein the system memory stores application data used by the CPU for executing one or more applications.

17. The method of claim 16,
wherein the CPU initiating an access of data in the system memory comprises the CPU initiating an access of application data in the system memory; and
wherein the memory controller performing said access of data in the system memory comprises the memory controller accessing the application data in the system memory.

18. The method of claim 16, wherein the replacement block of data in the system memory comprises application data.

19. The method of claim 1, wherein the computer system includes a display, wherein the system memory stores graphics data used for presenting images on the display;
wherein the CPU initiating an access of data in the system memory comprises the CPU initiating an access of graphics data in the system memory; and
wherein the memory controller performing said access of data in the system memory comprises the memory controller accessing the graphics data in the system memory.

20. The method of claim 1, wherein the computer system includes a display, wherein the system memory stores graphics data used for presenting images on the display;
wherein the replacement block of data in the system memory comprises graphics data.

21. The method of claim 1, wherein said determining a replacement block of data in the system memory comprises determining a least recently used block of data in the system memory.

22. The method of claim 1, wherein said determining a replacement block of data in the system memory comprises determining a true least recently used block of data in the system memory.

23. The method of claim 1, wherein said determining a replacement block of data in the system memory comprises determining a pseudo least recently used block of data in the system memory.

24. The method of claim 1, wherein the memory controller comprises a hardware compression engine and a hardware decompression engine.

25. The method of claim 1, wherein the data includes application code and application data.

26. A method for managing memory accesses in a system a system including a CPU, a system memory for storing data, and a memory controller coupled to the system memory, wherein the memory controller performs memory control functions for the system memory, wherein the memory controller includes a hardware compression and decompression engine, the method comprising:

the CPU requesting data from the memory controller, wherein the data resides in the system memory in a compressed format, wherein the system memory is a volatile memory which stores uncompressed data currently being used for execution by the CPU, wherein the uncompressed data includes most recently used data;

determining a replacement block of data in the system memory after said requesting;

the memory controller compressing said replacement block of data;

the memory controller storing said compressed replacement block of data in said system memory after said compressing said replacement block of data;

the memory controller decompressing said requested data after said requesting to produce uncompressed requested data; and the memory controller providing said uncompressed requested data to the CPU.

27. The method of claim 26, further comprising:

marking said uncompressed requested data as most recently used data.

28. The method of claim 26, wherein the memory controller comprises a hardware compression engine and a hardware decompression engine.

29. The method of claim 26, wherein the data includes application code and application data.

30. A method for managing data accesses in a system including a CPU, a system memory for storing data, a memory controller coupled to the system memory, and a non-volatile memory coupled to the memory controller, wherein the memory controller performs memory control functions for the system memory, wherein the memory controller includes a hardware compression and decompression engine, the method comprising:

the CPU initiating an access of data in the system memory, wherein the system memory is a volatile memory which stores uncompressed data currently being used for execution by the CPU, wherein the uncompressed data includes most recently used data;

determining a replacement block of data in the system memory after said initiating;

the memory controller compressing said replacement block of data;

the memory controller transferring said compressed replacement block to the non-volatile memory for storage after said compressing said replacement block of data;

wherein said compressing said replacement block of data and transferring said compressed replacement block of data to the non-volatile memory operates to free up at least a portion of said system memory;

the memory controller performing said access of data in the system memory.

31. The method of claim 30, further comprising:

marking said data as most recently used data.

32. The method of claim 30, wherein the CPU initiating an access of data in the system memory comprises the CPU initiating a read of requested data in the system memory, wherein the memory controller performing said access of data in the system memory includes:

the memory controller providing said requested data to the CPU.

33. The method of claim 32, further comprising:

marking said requested data as most recently used data.

34. The method of claim 32, wherein the requested data resides in the system memory in a compressed format, wherein the memory controller providing said requested data to the CPU includes:

the memory controller decompressing said requested data after the CPU initiating the access to produce uncompressed requested data; and the memory controller storing said uncompressed requested data in the system memory.

35. The method of claim 32, wherein the requested data resides in the non-volatile memory, wherein the memory controller providing said requested data to the CPU includes:

the memory controller accessing said requested data from the non-volatile memory; and the memory controller storing said requested data in the system memory.

36. The method of claim 32, wherein the requested data resides in the non-volatile memory in a compressed format, wherein the memory controller providing said requested data to the CPU includes:

the memory controller accessing said requested data from the non-volatile memory;

the memory controller decompressing the requested data to produce uncompressed requested data; and the memory controller storing said uncompressed requested data in the system memory.

37. The method of claim 30, wherein the CPU initiating an access of data in the system memory comprises the CPU initiating a write of first data to the system memory, wherein the memory controller performing said access of data in the system memory comprises:

the memory controller writing said first data to the system memory after the memory controller compressing said replacement block of data and storing said compressed replacement block of data in said system memory.

38. The method of claim 37, further comprising:

marking said first data as most recently used data.

39. The method of claim 30, wherein the CPU initiating an access of data in the system memory comprises the CPU initiating a write of first data to the system memory, wherein the memory controller performing said access of data in the system memory comprises:

the memory controller compressing the first data to produce compressed first data; and the memory controller writing said compressed first data to the system memory after the memory controller compressing said replacement block of data and storing said compressed replacement block of data in said system memory.

40. The method of claim 30,
the memory controller determining if the data resides in the system memory in an uncompressed format in response to the CPU initiating the access of data in the system memory;
wherein the memory controller compresses the replacement block of data and transfers the compressed replacement block of data to the non-volatile memory in response to the memory controller determining that the data does not reside in the system memory in an uncompressed format.

41. The method of claim 40,
wherein the memory controller determining if the data resides in the system memory in an uncompressed format comprises the memory controller determining if a page hit occurs;
wherein the memory controller compresses the replacement block of data and transfers the compressed replacement block of data to the non-volatile memory in response to the memory controller determining that a page miss has occurred.

42. The method of claim 30, wherein the memory controller compressing said replacement block of data comprises the memory controller performing a lossless compression on said replacement block of data.

43. The method of claim 30, wherein the memory controller compressing said replacement block of data comprises the memory controller performing a lossy compression on said replacement block of data.

44. The method of claim 30, wherein the system memory stores application data used by the CPU for executing one or more applications.

45. The method of claim 44,
wherein the CPU initiating an access of data in the system memory comprises the CPU initiating an access of application data in the system memory; and
wherein the memory controller performing said access of data in the system memory comprises the memory controller accessing the application data in the system memory.

46. The method of claim 44, wherein the replacement block of data in the system memory comprises application data.

47. The method of claim 30, wherein the computer system includes a display, wherein the system memory stores graphics data used for presenting images on the display;
wherein the CPU initiating an access of data in the system memory comprises the CPU initiating an access of graphics data in the system memory; and
wherein the memory controller performing said access of data in the system memory comprises the memory controller accessing the graphics data in the system memory.

48. The method of claim 30, wherein the computer system includes a display, wherein the system memory stores graphics data used for presenting images on the display;
wherein the replacement block of data in the system memory comprises graphics data.

49. The method of claim 30, wherein said determining a replacement block of data in the system memory comprises determining a least recently used block of data in the system memory.

50. The method of claim 30, wherein said determining a replacement block of data in the system memory comprises determining a true least recently used block of data in the system memory.

51. The method of claim 30, wherein said determining a replacement block of data in the system memory comprises determining a pseudo least recently used block of data in the system memory.

52. The method of claim 30, wherein the memory controller comprises a hardware compression engine and a hardware decompression engine.

53. The method of claim 30, wherein the data includes application code and application data.

54. A method for managing memory accesses in a system including a CPU, a system memory for storing data, a memory controller coupled to the system memory, and a non-volatile memory coupled to the memory controller, wherein the memory controller performs memory control functions for the system memory, wherein the memory controller includes a hardware compression and decompression engine, the method comprising:
the CPU requesting data from the memory controller, wherein the data resides in the system memory in a compressed format, wherein the system memory is a volatile memory which stores uncompressed data currently being used for execution by the CPU, wherein the uncompressed data includes most recently used data;
determining a replacement block of data in the system memory after said requesting;
the memory controller compressing said replacement block of data;
the memory controller transferring said compressed replacement block of data to the non-volatile memory after said compressing said replacement block of data;
the memory controller decompressing said requested data after said requesting to produce uncompressed requested data; and
the memory controller providing said uncompressed requested data to the CPU.

55. The method of claim 54, further comprising:
marking said uncompressed requested data as most recently used data.

56. The method of claim 54, wherein the memory controller comprises a hardware compression engine and a hardware decompression engine.

57. The method of claim 54, wherein the data includes application code and application data.

58. A system with improved memory access management, the system comprising:
a CPU;
a system memory, wherein the system memory is a volatile memory for storing data, wherein the data includes uncompressed data currently being used for execution by the CPU, wherein the uncompressed data includes most recently used data; and
a memory controller coupled to the CPU and to the system memory, wherein the memory controller performs memory control functions for the system memory, wherein the memory controller includes a hardware compression/decompression engine;
wherein the CPU is operable to initiate an access of data in the system memory;
wherein, in response to the access, the memory controller is operable to access a replacement block of data in the system memory, compress said replacement block of data, and store said compressed replacement block of data in said system memory, wherein said compression of said replacement block of data and storage of said compressed replacement block of data in said system memory operates to free up at least a portion of said system memory;

wherein the memory controller is operable to perform said access of data in the system memory after freeing up said at least a portion of said system memory.

59. The system of claim 58, wherein said data is marked as most recently used data.

60. The system of claim 58, wherein the CPU is operable to initiate a read of requested data in the system memory;

wherein, in performing said access of data in the system memory, the memory controller is operable to provide said requested data to the CPU.

61. The system of claim 60, wherein the requested data resides in the system memory in a compressed format;

wherein, in providing said requested data to the CPU, the memory controller is operable to decompress said requested data and store said uncompressed requested data in the system memory.

62. The system of claim 60, wherein the system further includes:

a non-volatile memory coupled to the memory controller, wherein the requested data resides in the non-volatile memory;

wherein, in providing said requested data to the CPU, the memory controller is operable to access said requested data from the non-volatile memory and store said requested data in the system memory.

63. The system of claim 60, wherein the system further includes:

a non-volatile memory coupled to the memory controller, wherein the requested data resides in the non-volatile memory in a compressed format;

wherein, in providing said requested data to the CPU, the memory controller is operable to access said requested data from the non-volatile memory, decompress the requested data to produce uncompressed requested data, and store said uncompressed requested data in the system memory.

64. The system of claim 58, wherein the CPU is operable to initiate a write of first data to the system memory;

wherein, in performing said access of data in the system memory, the memory controller is operable to write said first data to the system memory.

65. The system of claim 58, wherein the CPU is operable to initiate a write of first data to the system memory;

wherein, in performing said access of data in the system memory, the memory controller is operable to compress the first data to produce compressed first data and write said compressed first data to the system memory.

66. The system of claim 58, wherein, in response to the access, the memory controller is operable to determine if the data resides in the system memory in an uncompressed format;

wherein the memory controller is operable to access the replacement block of data, compress the replacement block of data, and store the compressed replacement block of data in the system memory in response to the memory controller determining that the data does not reside in the system memory in an uncompressed format.

67. The system of claim 66, wherein the memory controller is operable to provide the data to the CPU in response to the memory controller determining that the data resides in the system memory in an uncompressed format.

68. The system of claim 66, wherein, in determining if the data resides in the system memory in an uncompressed format, the memory controller is operable to determine if a page hit occurs;

wherein the memory controller accesses the replacement block of data, compresses the replacement block of data, and stores the compressed replacement block of data in the system memory in response to the memory controller determining that a page miss has occurred.

69. The system of claim 58, wherein the compression/decompression engine comprised in the memory controller is operable to perform a lossless compression on said replacement block of data.

70. The system of claim 58, wherein the compression/decompression engine comprised in the memory controller is operable to perform a lossy compression on said replacement block of data.

71. The system of claim 58, wherein the system memory stores application data used by the CPU for executing one or more applications;

wherein the data comprises application data.

72. The system of claim 58, wherein the system further includes a display;

wherein the system memory stores graphics data used for presenting images on the display;

wherein the data comprises graphics data.

73. The system of claim 58, wherein the replacement block of data comprises a least recently used block of data in the system memory.

74. The system of claim 58, wherein the replacement block of data comprises a true least recently used block of data in the system memory.

75. The system of claim 58, wherein the replacement block of data comprises a pseudo least recently used block of data in the system memory.

76. The system of claim 58, wherein the system comprises a computer system.

77. The system of claim 58, wherein the memory controller comprises a hardware compression engine and a hardware decompression engine.

78. The system of claim 58, wherein the data includes application code and application data.

79. A system with improved memory access management, the system comprising:

a CPU;

a system memory, wherein the system memory is a volatile memory for storing data, wherein the data includes uncompressed data currently being used for execution by the CPU, wherein the uncompressed data includes most recently used data;

a memory controller coupled to to the CPU and to the system memory, wherein the memory controller performs memory control functions for the system memory, wherein the memory controller includes a hardware compression/decompression engine; and a non-volatile memory coupled to the memory controller;

wherein the CPU is operable to initiate an access of data in the system memory;

wherein, in response to the access, the memory controller is operable to access a replacement block of data in the system memory, compress said replacement block of data, and transfer said compressed replacement block of data to the non-volatile memory, wherein said compression of said replacement block of data and transfer of said compressed replacement block of data to the non-volatile memory operates to free up at least a portion of said system memory;

wherein the memory controller is operable to perform said access of data in the system memory after freeing up said at least a portion of said system memory.

80. The system of claim 79, wherein said data is marked as most recently used data.

81. The system of claim 79, wherein the CPU is operable to initiate a read of requested data in the system memory;

wherein, in performing said access of data in the system memory, the memory controller is operable to provide said requested data to the CPU.

82. The system of claim 81, wherein the requested data resides in the system memory in a compressed format;

wherein, in providing said requested data to the CPU, the memory controller is operable to decompress said requested data and store said uncompressed requested data in the system memory.

83. The system of claim 81, wherein the requested data resides in the non-volatile memory;

wherein, in providing said requested data to the CPU, the memory controller is operable to access said requested data from the non-volatile memory and store said requested data in the system memory.

84. The system of claim 81, wherein the requested data resides in the non-volatile memory in a compressed format;

wherein, in providing said requested data to the CPU, the memory controller is operable to access said requested data from the non-volatile memory, decompress the requested data to produce uncompressed requested data, and store said uncompressed requested data in the system memory.

85. The system of claim 79, wherein the CPU is operable to initiate a write of first data to the system memory;

wherein, in performing said access of data in the system memory, the memory controller is operable to write said first data to the system memory.

86. The system of claim 79, wherein the CPU is operable to initiate a write of first data to the system memory;

wherein, in performing said access of data in the system memory, the memory controller is operable to compress the first data to produce compressed first data and write said compressed first data to the system memory.

87. The system of claim 79, wherein, in response to the access, the memory controller is operable to determine if the data resides in the system memory in an uncompressed format;

wherein the memory controller is operable to access the replacement block of data, compress the replacement block of data, and transfer the compressed replacement block of data to the non-volatile memory in response to the memory controller determining that the data does not reside in the system memory in an uncompressed format.

88. The system of claim 79, wherein the compression/decompression engine comprised in the memory controller is operable to perform a lossless compression on said replacement block of data.

89. The system of claim 79, wherein the compression/decompression engine comprised in the memory controller is operable to perform a lossy compression on said replacement block of data.

90. The system of claim 79, wherein the system memory stores application data used by the CPU for executing one or more applications;

wherein the data comprises application data.

91. The system of claim 79, wherein the system further includes a display;

wherein the system memory stores graphics data used for presenting images on the display;

wherein the data comprises graphics data.

92. The system of claim 79, wherein the replacement block of data comprises a least recently used block of data in the system memory.

93. The system of claim 79, wherein the replacement block of data comprises a true least recently used block of data in the system memory.

94. The system of claim 79, wherein the replacement block of data comprises a pseudo least recently used block of data in the system memory.

95. The system of claim 79, wherein the system comprises a computer system.

96. The system of claim 79, wherein the memory controller comprises a hardware compression engine and a hardware decompression engine.

97. The system of claim 79, wherein the data includes application code and application data.

* * * * *